June 16, 1925.
L. L. COLLINS
1,542,494
AUTOMATIC POWER OPERATED PNEUMATIC SURFACER
Filed Sept. 26, 1922  13 Sheets-Sheet 1
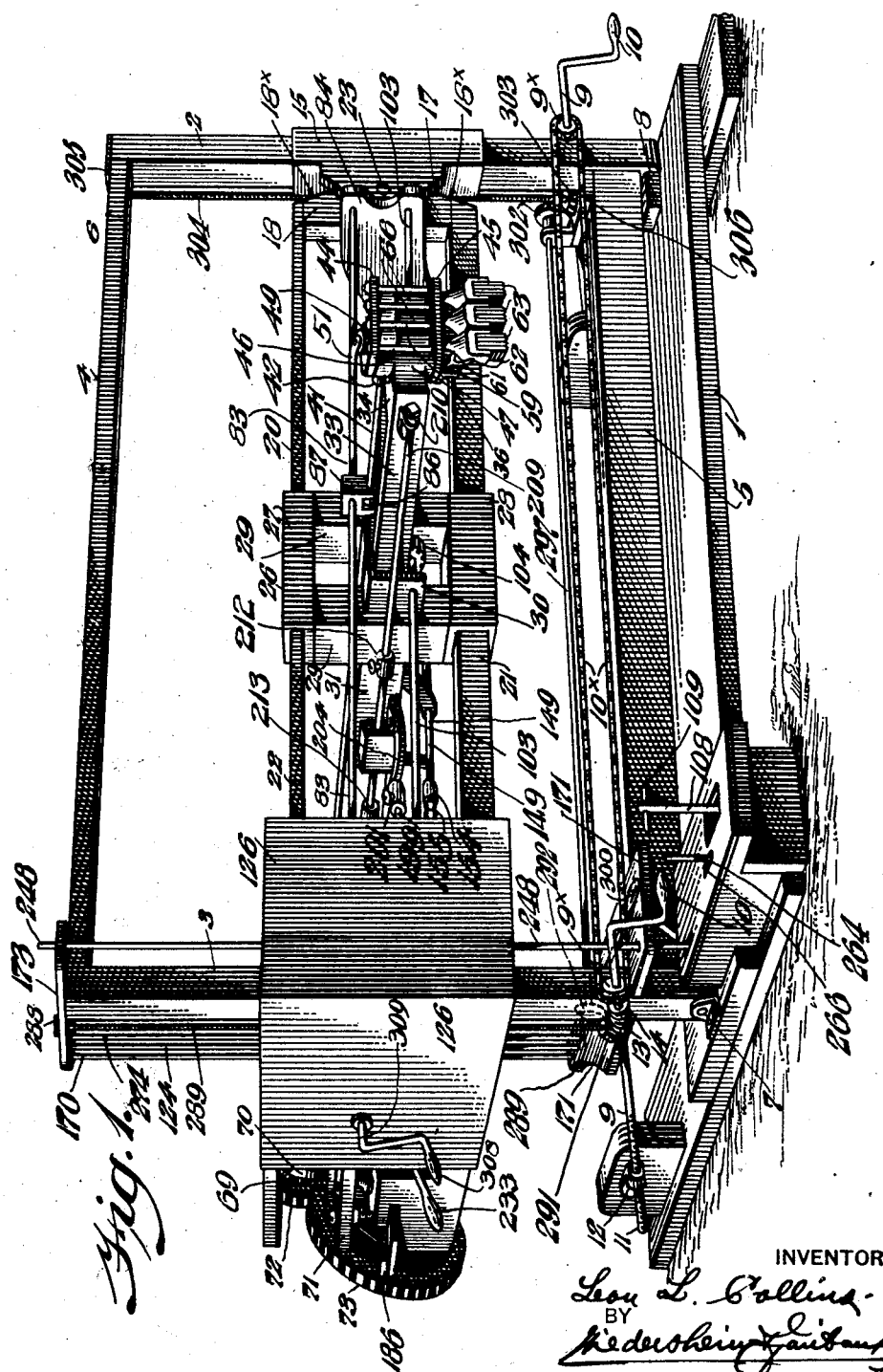
INVENTOR:
Leon L. Collins.
BY
ATTORNEYS.

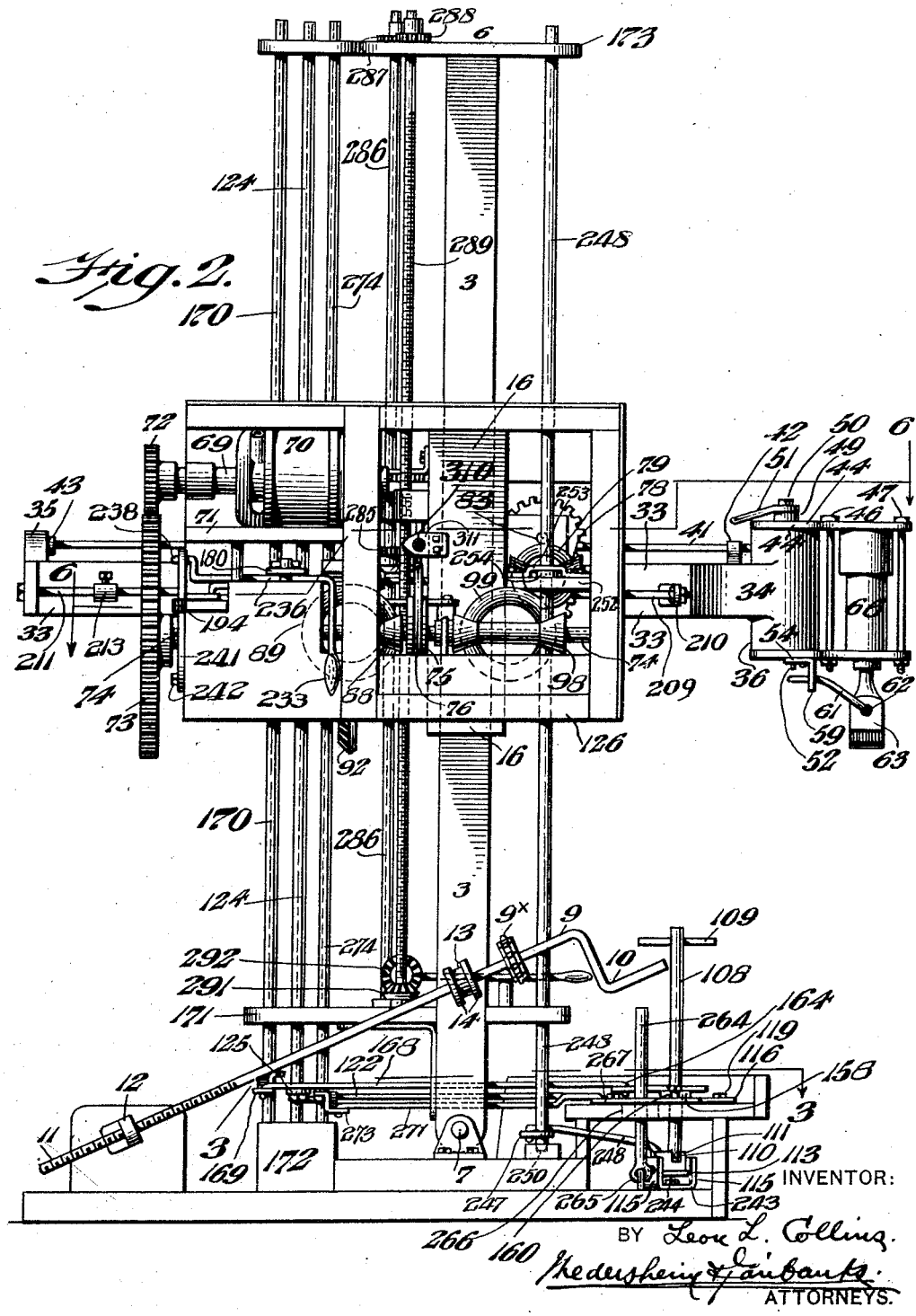

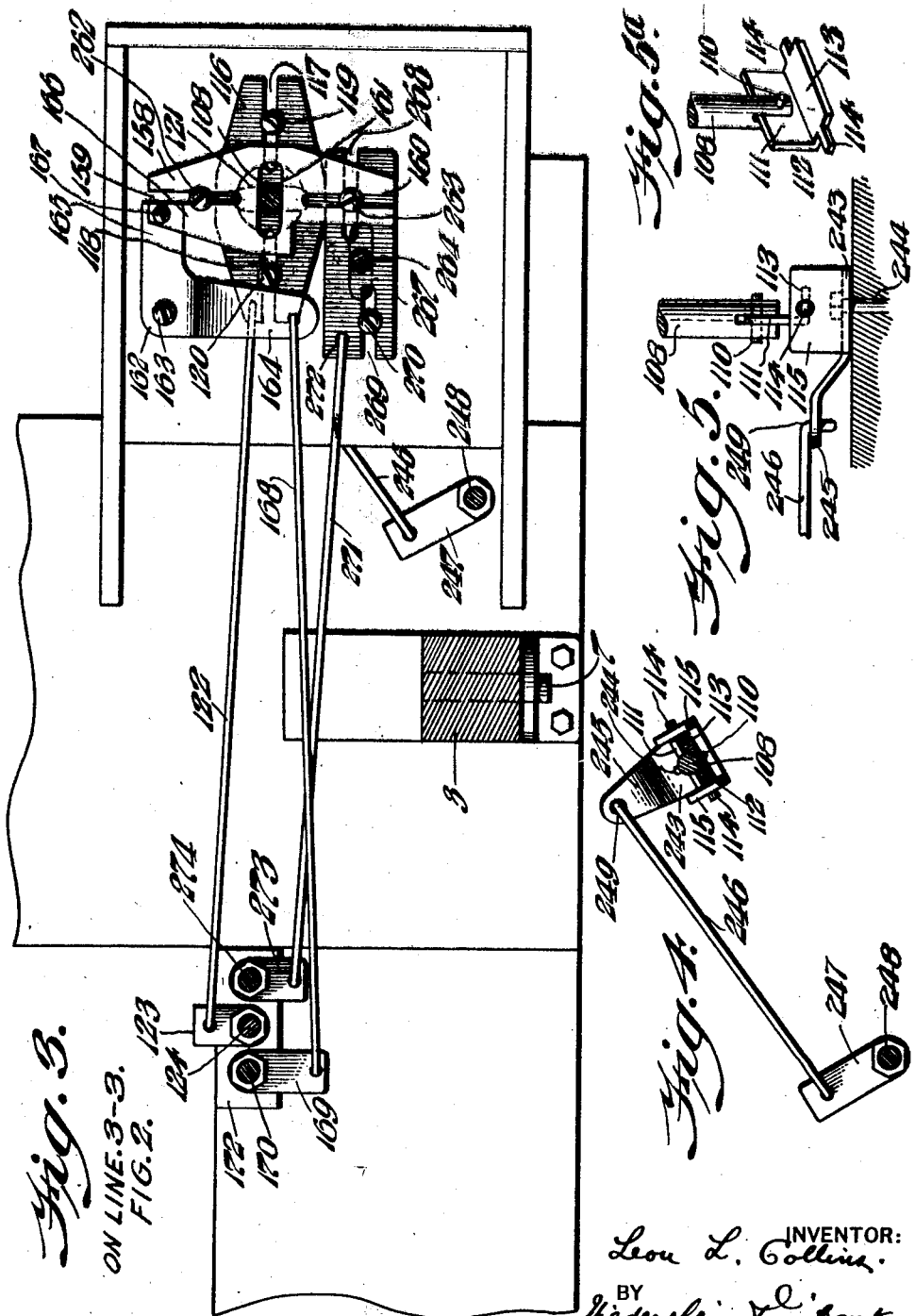

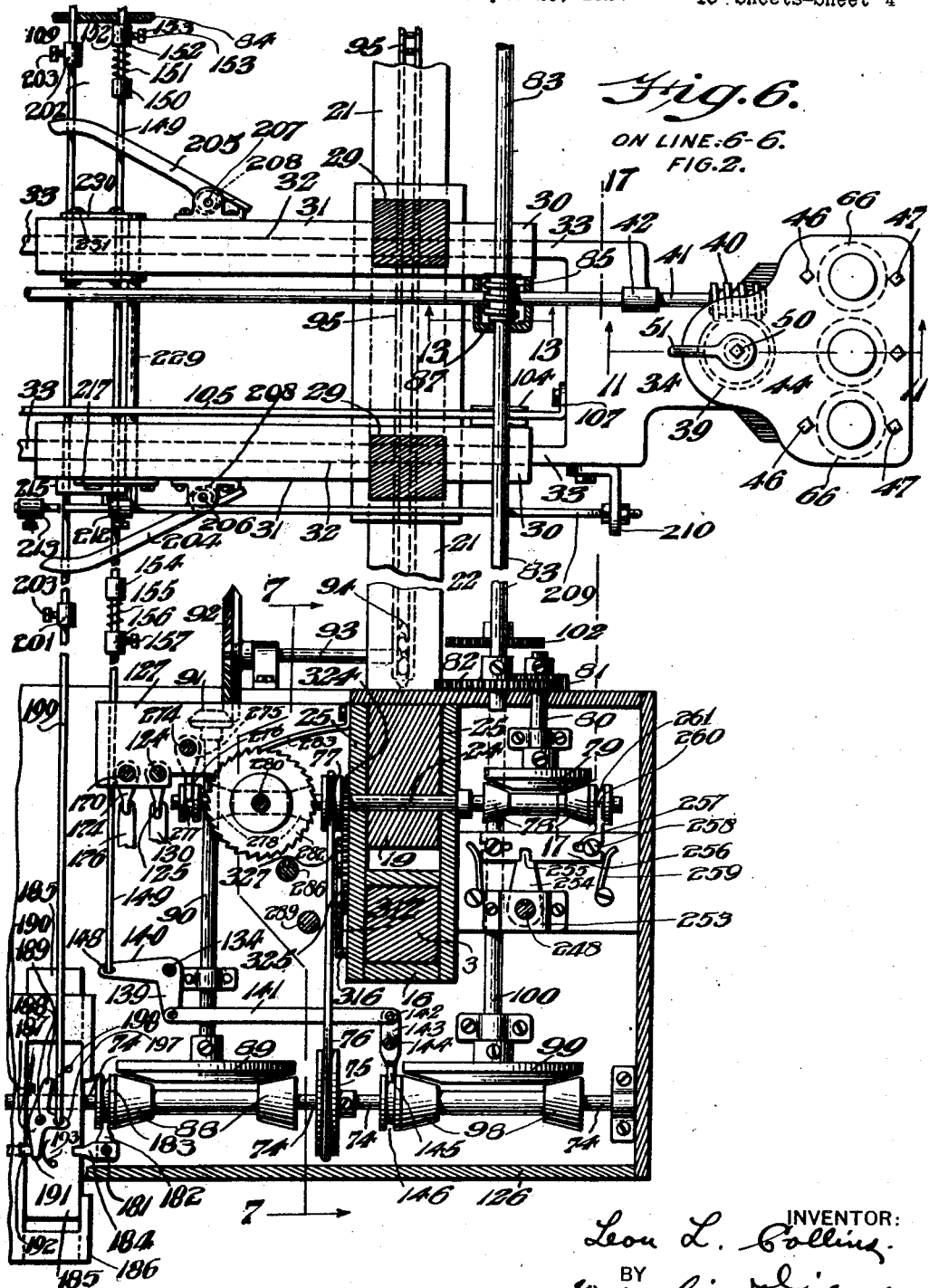

June 16, 1925.
L. L. COLLINS
1,542,494
AUTOMATIC POWER OPERATED PNEUMATIC SURFACER
Filed Sept. 26, 1922    13 Sheets-Sheet 5
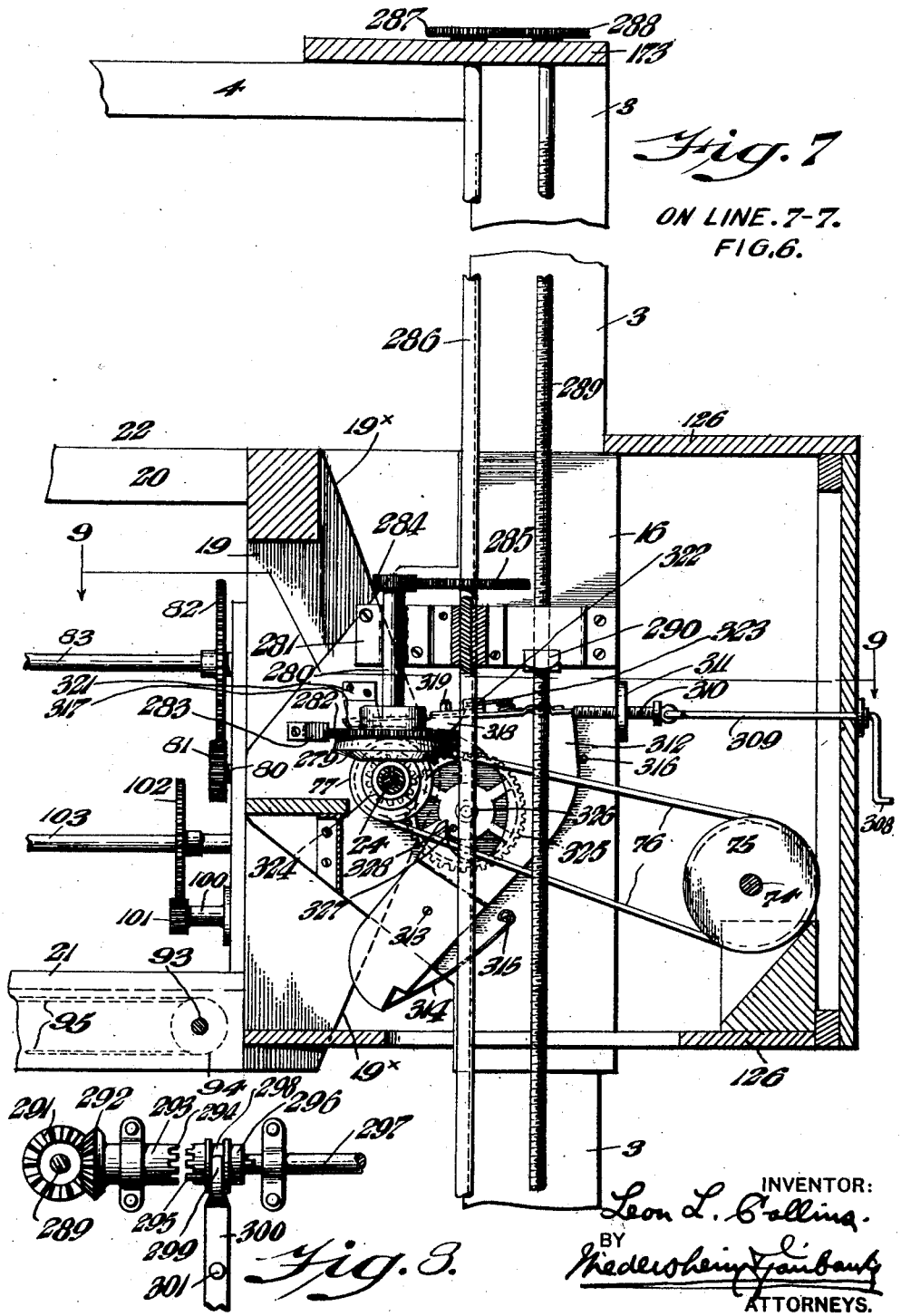

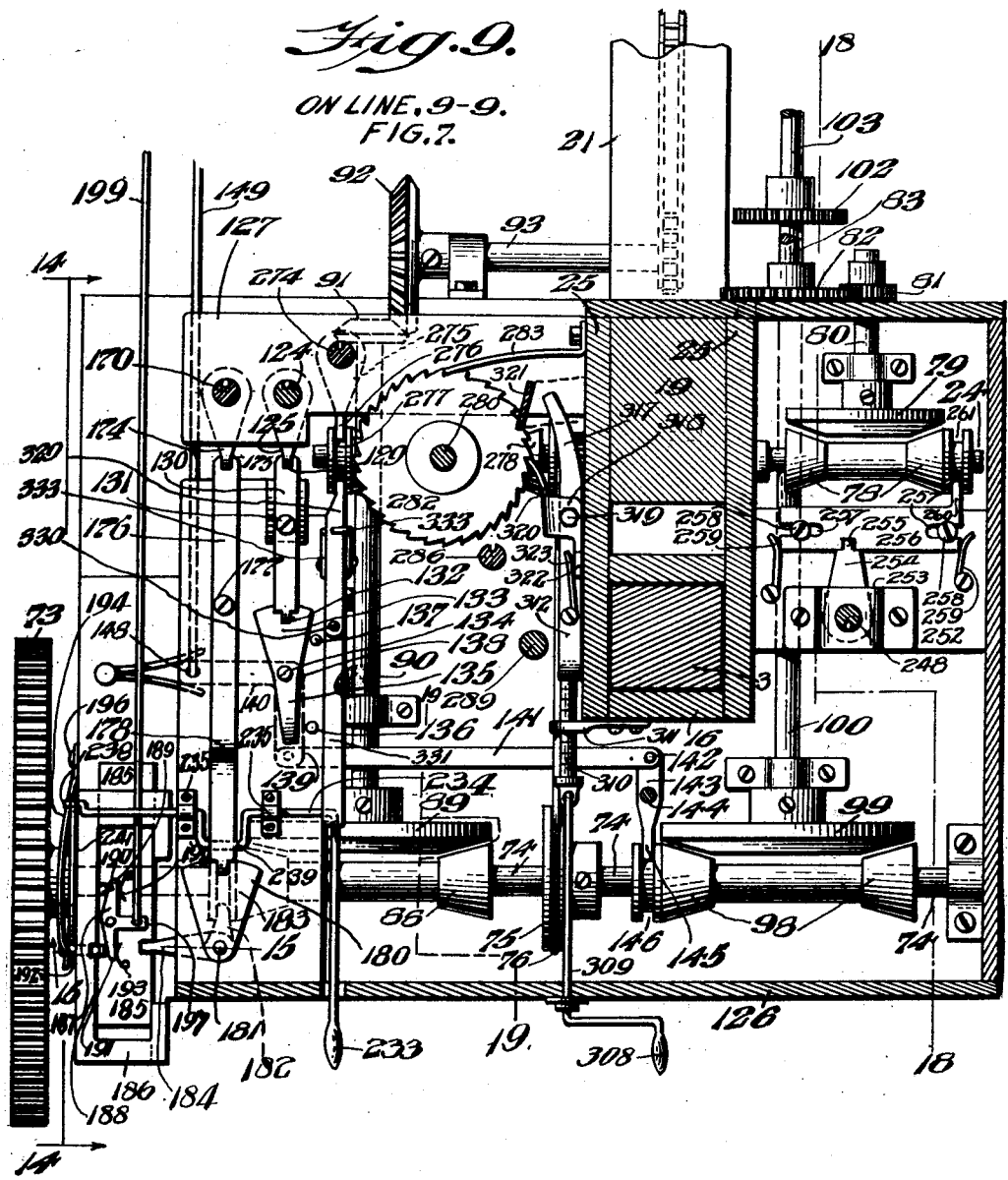

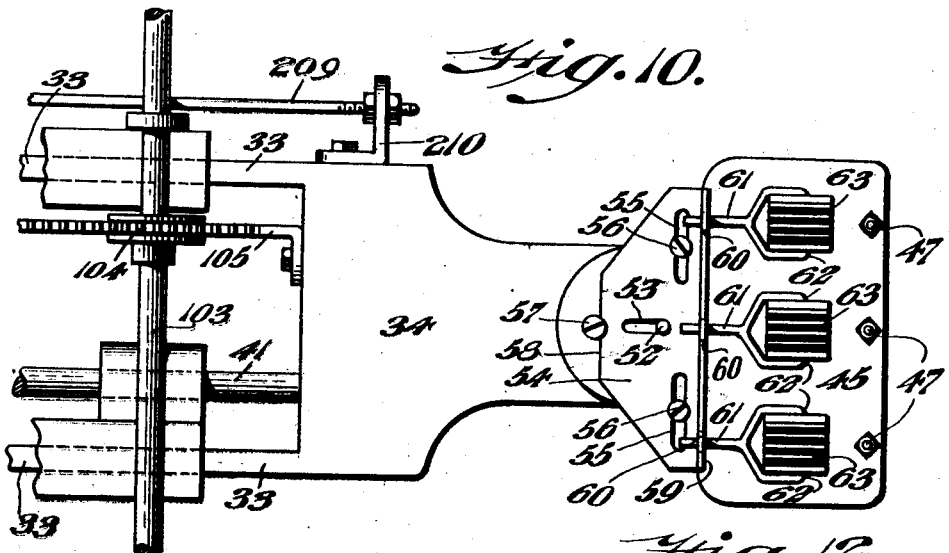
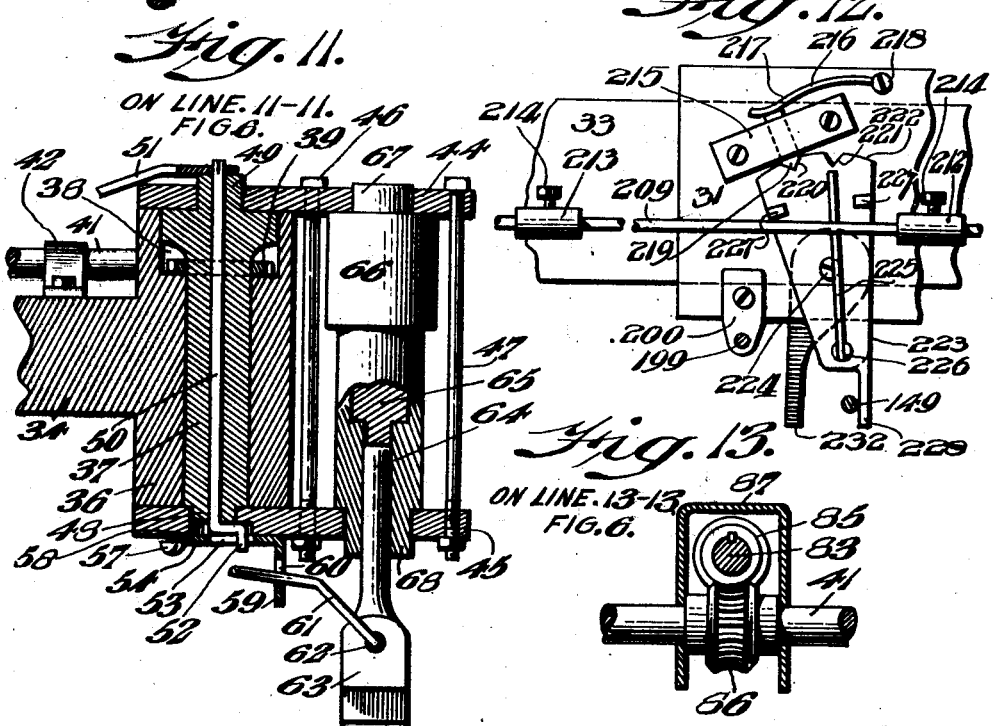

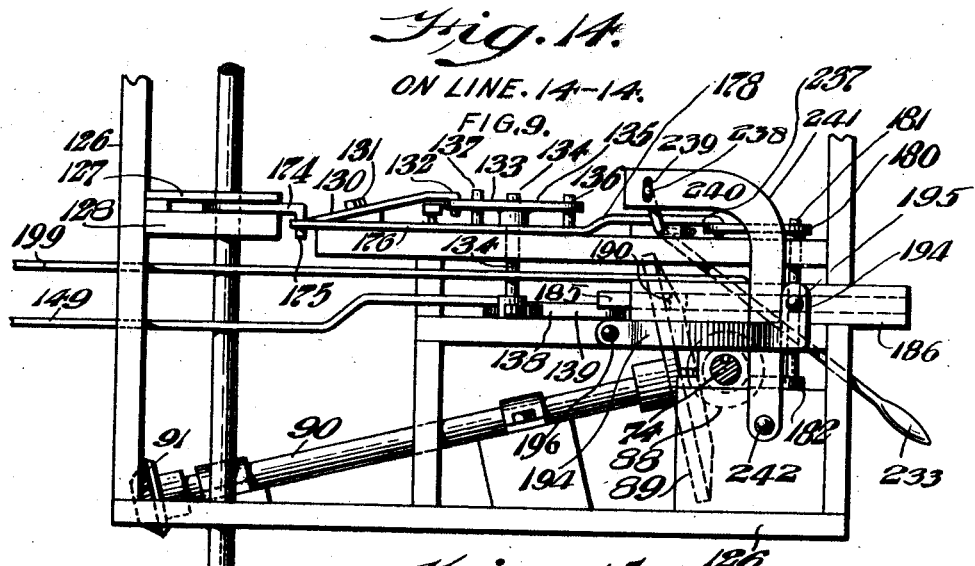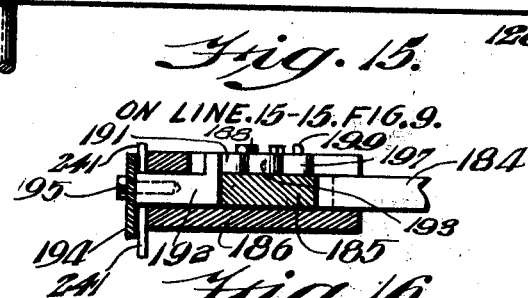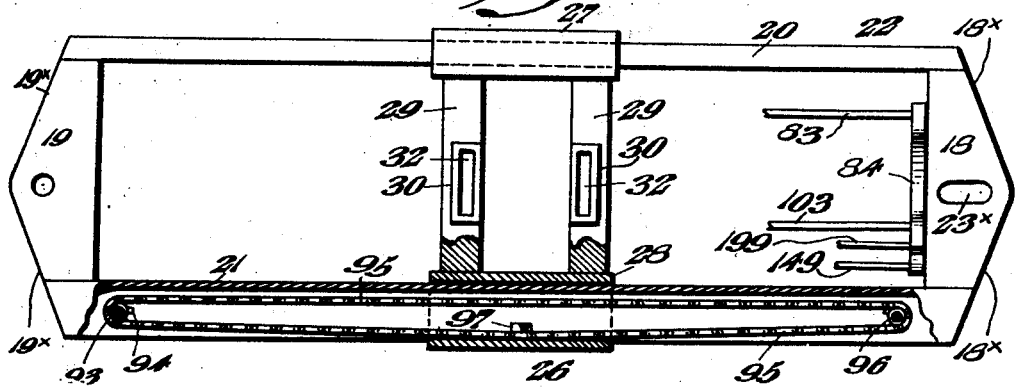

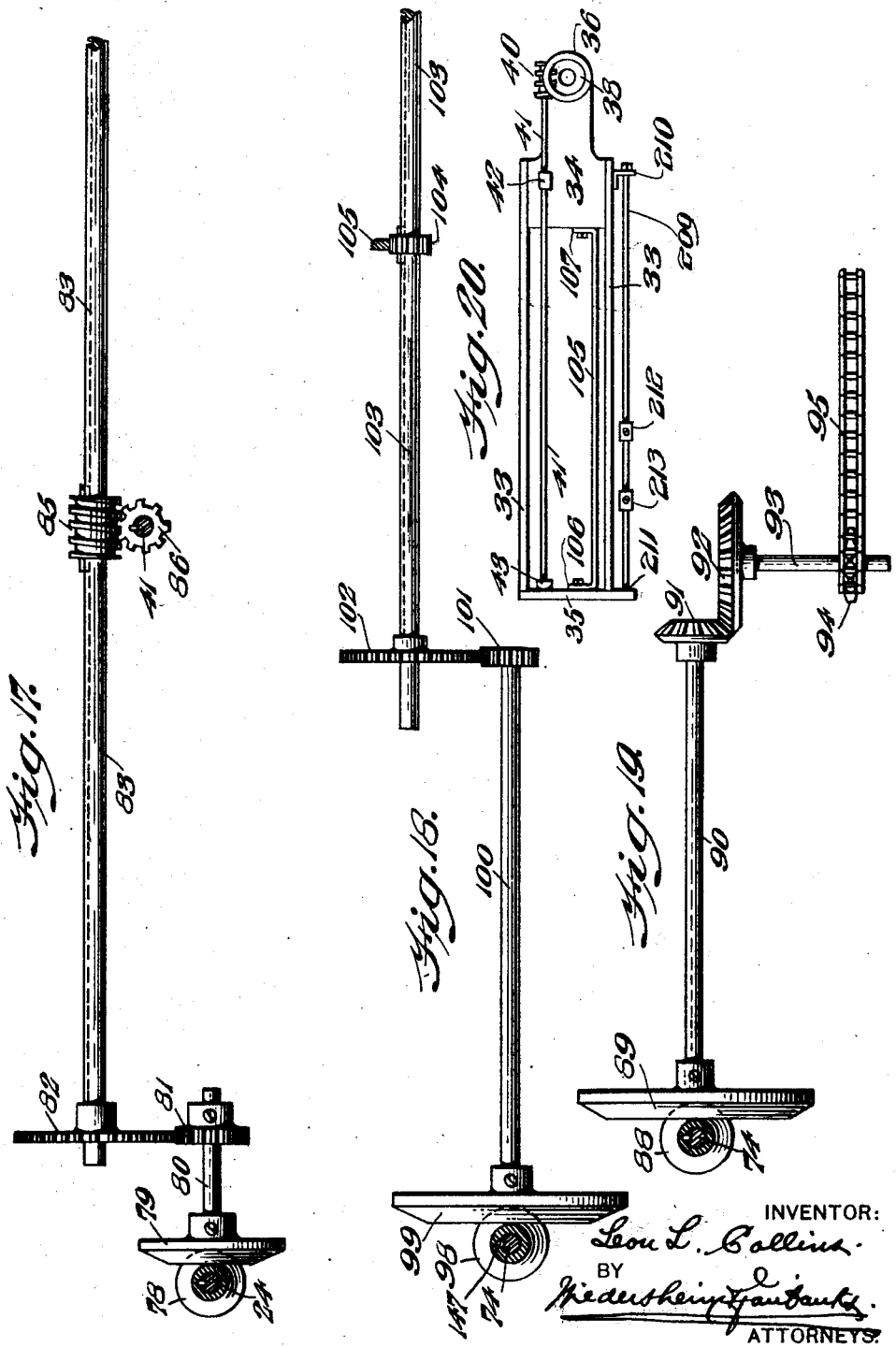

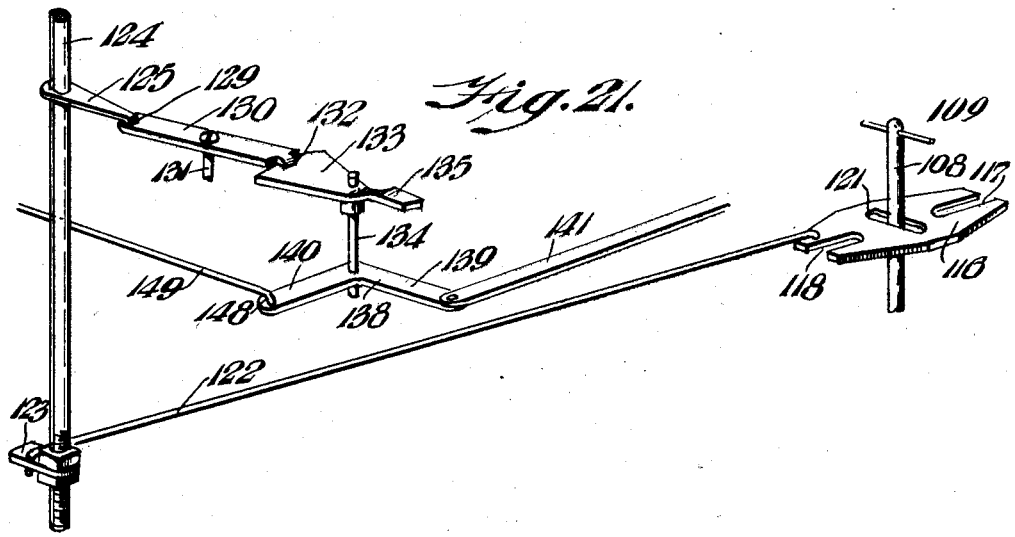

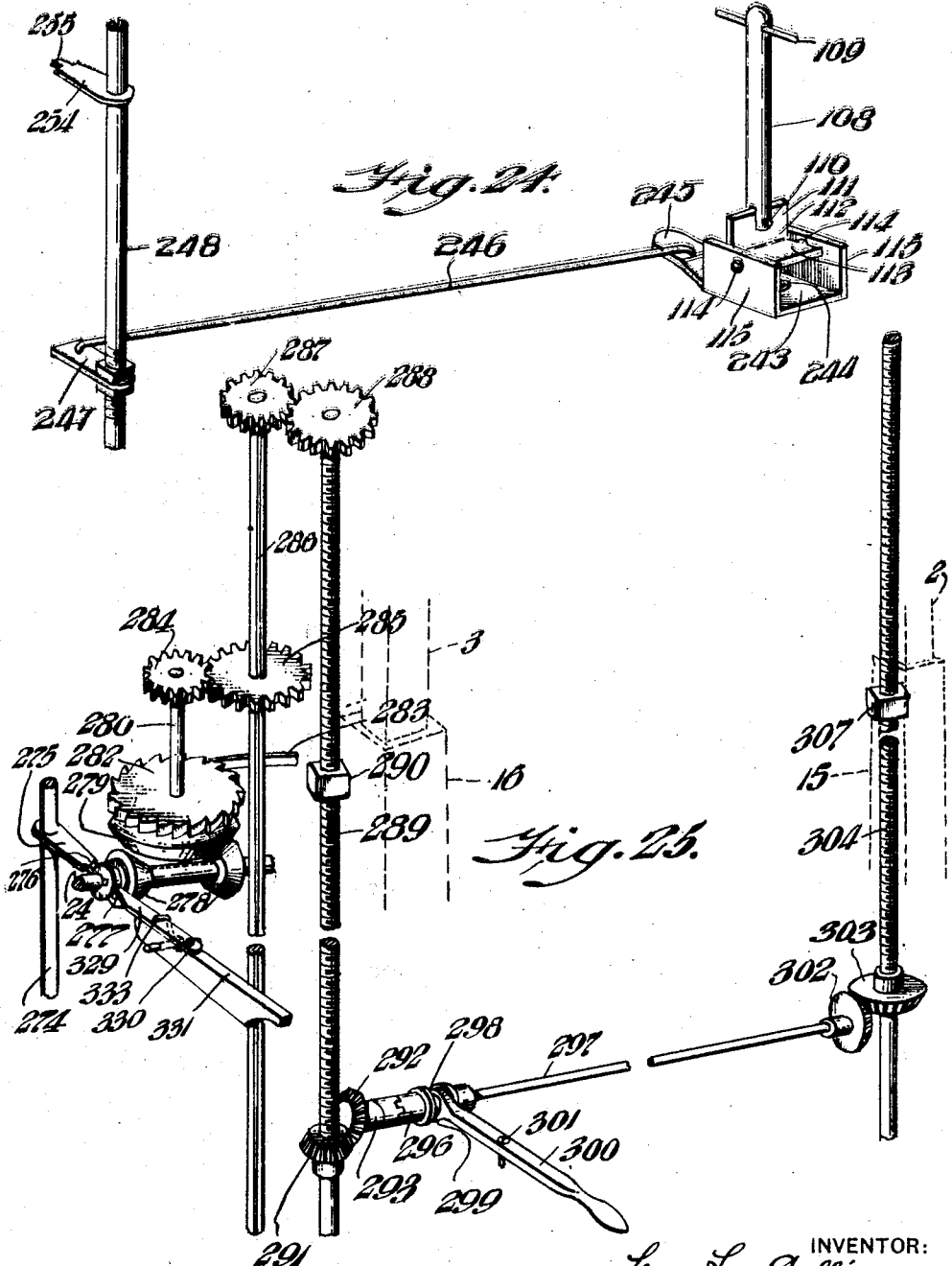

June 16, 1925. 1,542,494
L. L. COLLINS
AUTOMATIC POWER OPERATED PNEUMATIC SURFACER
Filed Sept. 26, 1922 13 Sheets-Sheet 12
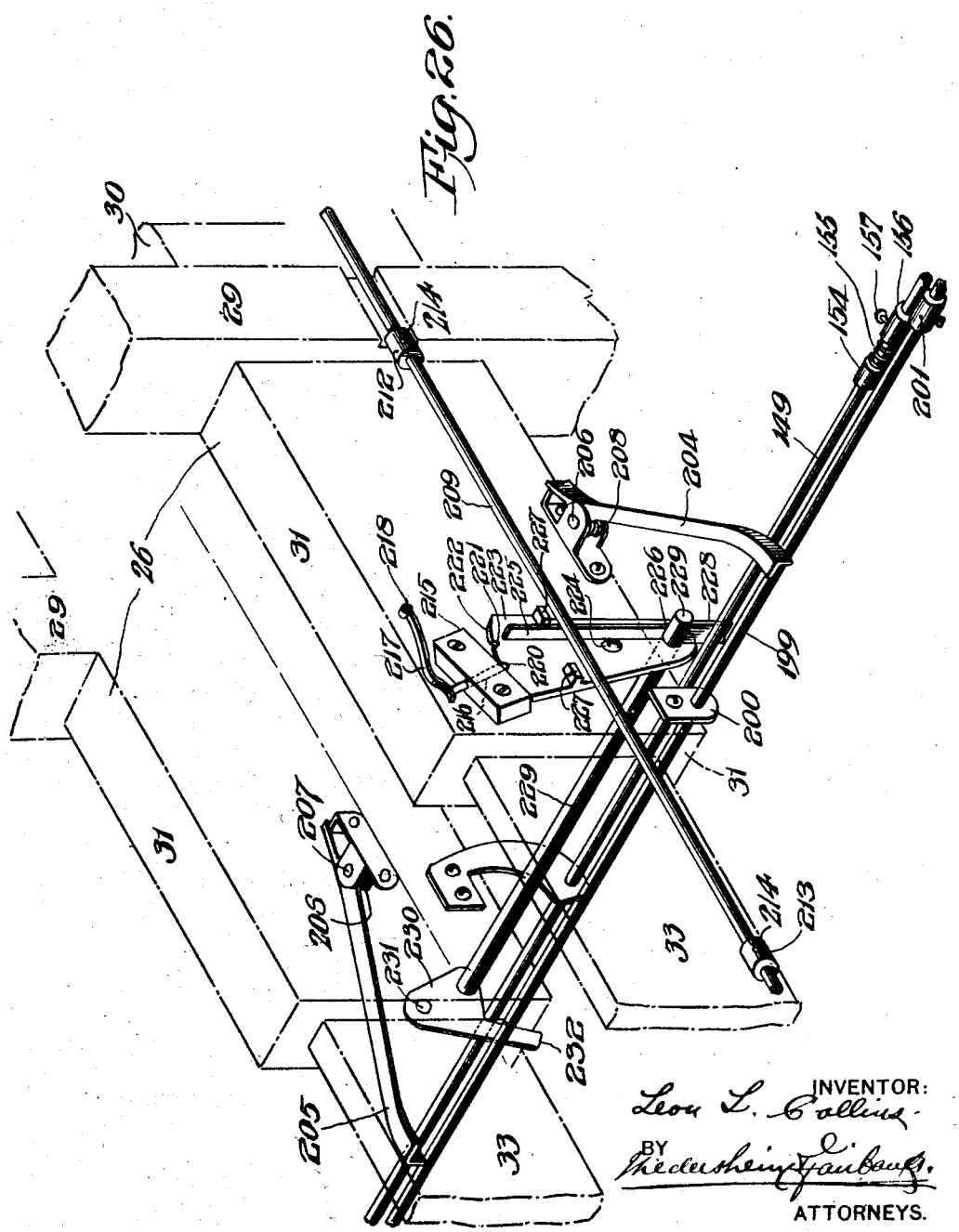

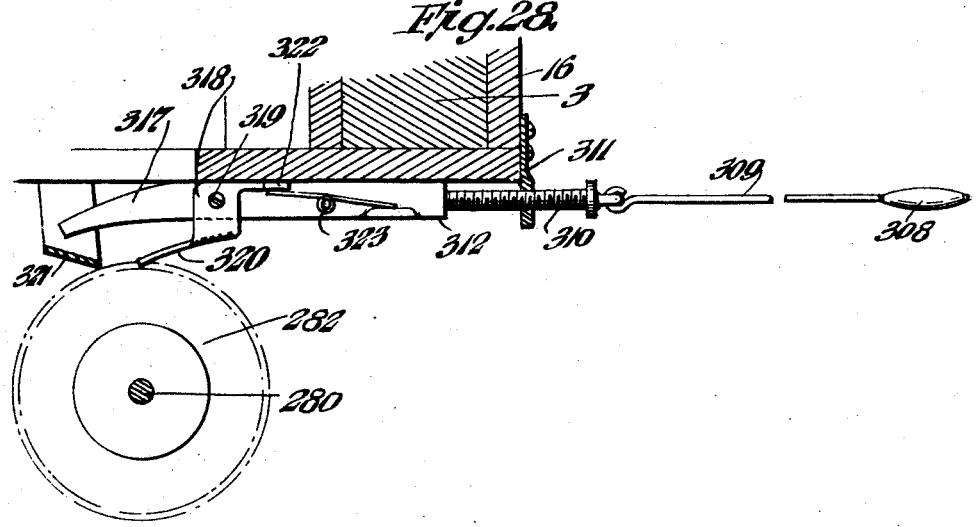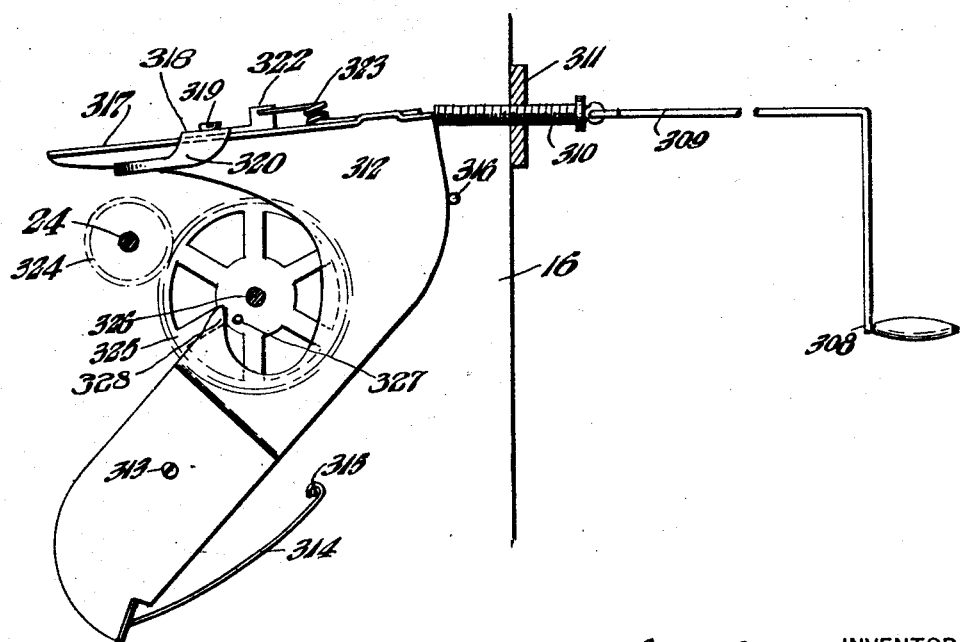

Patented June 16, 1925.

1,542,494

UNITED STATES PATENT OFFICE.

LEON L. COLLINS, OF PLEASANTVILLE, NEW JERSEY.

AUTOMATIC POWER-OPERATED PNEUMATIC SURFACER.

Application filed September 26, 1922. Serial No. 590,619.

*To all whom it may concern:*

Be it known that I, LEON L. COLLINS, a citizen of the United States, residing at Pleasantville, in the county of Atlantic, State of New Jersey, have invented a new and useful Automatic Power-Operated Pneumatic Surfacer, of which the following is a specification.

My invention consists of a novel construction of an automatic power operated pneumatic surfacer, whereby I make provision for the employment of a plurality of pneumatic hammers which are mechanically held and mechanically or manually controlled with respect to a novel construction of a pneumatic carriage.

It further consists of a novel construction of carrier bars and their adjuncts, a sliding cross-head in which said bars are slidably mounted, said bars supporting a novel construction of head in which a plurality of pneumatic tools are supported and adapted to be manually or mechanically adjusted.

It further consists of a novel construction of frame especially adapted for moving the hammers over a rectangular surface.

It further consists of a novel construction of an adjustable bridge, whereby the pneumatically operated implements are supported, said bridge being adapted to stand horizontally or to be inclined to the right or left, thereby allowing the hammer or hammers to work on a horizontal or inclined surface, as may be desired.

It further consists of a novel construction of adjustable standards which are adapted to stand vertically or be inclined towards the front or back, in conjunction with supporting devices for the carrier bars, pneumatic hammers and their adjuncts, whereby the hammer or hammers are enabled to work on a level or inclined surface, as may be desired.

It further consists of a novel construction of a power hoist, which allows the operator to raise or lower the principal operating parts of the machine without stopping the operation of the same.

It further consists of a novel construction of power drive, which allows the machine to be of any size and weight and to carry any number of pneumatic hammers and still have the desired range of movement over the surface of the stone, under the full control of the operator.

It further consists of a novel construction of hand controlled mechanism, wherein a single lever controls the movement of the hammers to the right and left, backwards and forwards, as well as the turning of the hammers and carriage to the right and left, the movement of the hammers being in the same direction as the movement of the lever.

It further consists of a novel construction of an automatic control, whereby the hammers are caused or enabled to work over a rectangular area of any width within the limit or capacity of the machine, the hammers being automatically lowered, when desired, to correspond with the amount being cut off the face of the stone which is being operated upon.

It further consists of a novel construction of driving mechanisms, provided with reversible friction drives, whereby the liability of injury or damage to any of the various operating mechanisms is reduced to a minimum, and the direction of movement of the desired element can be readily reversed.

It further consists of a novel construction of pivoted frame in which the various operative parts of my device are mounted, and means for inclining or actuating said frame and its adjuncts in either direction from the vertical by manually operated mechanisms, which are operative in unison and located at opposite ends of the machine.

It further consists of a novel construction of actuating mechanism and tripping mechanism therefor whereby the extent of movement of the various co-acting mechanisms can be regulated according to requirements.

It further consists of other novel features of advantage and construction as will be hereinafter set forth.

For the purpose of illustrating my invention, I have shown in the accompanying drawings, forms thereof which are at present preferred by me, since the same will give in practice satisfactory and reliable results, although it is to be understood that the various instrumentalities of which my invention consists may be variously arranged and organized and that my invention is not limited to the precise arrangement and organization of these instrumentalities as herein shown and described.

Figure 1 represents a perspective view of an automatic power operated pneumatic surfacer, embodying my invention.

Figure 2 represents an end elevation of Figure 1, viewed from the left of said figure, a portion of the cage and control lever box being removed.

Figure 3 represents a section on line 3—3 Figure 2, showing the arrangement of the controlling devices, certain of the parts being shown in elevation.

Figure 4 represents a plan view partly in section of certain of the parts, partially seen in Figure 3.

Figure 5 represents a detached view showing a side elevation of certain of the parts seen in Figure 4.

Figure 5^A represents a perspective view of a portion of Figure 5.

Figure 6 represents a horizontal section on line 6—6 Figure 2, showing the top plan view of the carrier bars, the head carrying a plurality of pneumatic tools and certain portions of the operating and tripping mechanisms to be hereinafter referred to, certain of the parts being shown in elevation.

Figure 7 represents a section on line 7—7 Figure 6, partly in elevation, showing details of the driving and actuating mechanism to be hereinafter referred to.

Figure 8 represents a plan view of certain of the clutch mechanism to be hereinafter referred to.

Figure 9 represents a section partly in elevation on line 9—9 Figure 7 showing on an enlarged scale certain of the shifting and reversing mechanisms, seen at the bottom of Figure 6.

Figure 10 represents a bottom plan view of the front of the carrier bar head showing the bottoms of the bush chisels and the mechanism for simultaneously actuating or turning the bush chisels or other stone working implements employed.

Figure 11 represents a section partly in elevation on line 11—11 Figure 6, showing the actuating mechanism for the bush chisels or other stone working implements.

Figure 12 represents on an enlarged scale a side elevation of certain of the operating mechanism to be hereinafter referred to.

Figure 13 represents a section on line 13—13 Figure 6, showing a portion of the actuating mechanism its gearing and housing for adjusting the bush chisels or other stone working implements.

Figure 14 represents a section on line 14—14 Figure 9, showing certain control mechanisms to be hereinafter referred to.

Figure 15 represents a section on line 15—15 Figure 9.

Figure 16 represents a front section of the bridge or frame and cross head in which the carrier bars for the pneumatic tools are supported, the lower portion of said figure being in section, and showing the sprocket mechanism for actuating the cross head and its adjuncts.

Figure 17, represents a detached view showing the friction drive, gearing and shaft, and worm thereon whereby the worm shaft is driven which effects the movement in unison of the stone cutting implements, the section being taken in line 17—17, Figure 6, and showing the shafting only.

Figure 18 represents a detached view showing the friction drive, shafts and intermediate gearing for driving the pinion which engages the rack carried by the carrier bars for actuating the pneumatic tool forward and back, the section being taken on line 18—18, Figure 9, and showing the shafting only.

Figure 19 represents a detached view of the friction drive, shafting and gearing, for actuating the sprocket chain, which effects the right and left hand movement of the cross-head, carrier bars and pneumatic tools carried thereby, the section being taken on line 19—19 Fig. 9 and showing the shafting diagrammatically.

Figure 20 represents on a reduced scale, a plan view of the carrier bars, the shaft which effects the adjustment of the stone cutting implements, and the rack, whereby the latter are moved backwards and forwards.

Figures 21, 22 and 23 represent detached perspective views of the hand operated controls and their adjuncts seen at the lower left hand end of Figure 1.

Figure 24 represents a detached perspective view of certain of the parts operated by the axial rotation of the control seen in Figs. 1, 4, 5, 21 and 22.

Figure 25 represents a detached perspective view of a portion of the hand operated control for the hoisting mechanism, to be referred to.

Figure 26 represents on an enlarged scale a perspective view of certain of the parts seen in Figure 12 in Fig. 6, and at the rear of Fig. 1, illustrating certain of the control and tappet mechanism partially hidden in Fig. 1.

Figure 27 represents a detailed view, in side elevation, showing the operating lever and pawl actuating mechanism, whereby an intermittent or step by step movement is caused to be imparted, when desired, to the feed screw seen in Figs. 7 and 25, certain of the shafting and details seen in Fig. 7 being omitted.

Figure 28 represents a plan view of the feed screw, pawl and its adjuncts, seen in Fig. 27, a portion of certain supports being shown in section.

Similar numerals of reference indicate corresponding parts.

Referring to the drawings:—

In carrying out my invention, it will be understood that the various coacting mechanisms, may be supported and collocated in various ways, and in the accompanying drawings, I have shown a preferred embodiment of my invention, wherein the various elements are supported in a suitable framework or housing, comprising the base 1, the right and left-hand uprights 2 and 3, which are tied together at their top and bottom by the horizontal upper and lower bars 4 and 5, thereby constituting a rigid rectangular frame, which I have designated in Figure 1 as 6 and which with its adjuncts may stand vertical, or it is capable of being adjusted to stand at an angle to either side of a vertical plane by reason of the bottom pivotal connections 7 and 8, which may be of any suitable construction. As a convenient means of tilting the frame 6 and its adjuncts I employ the actuating rods 9 best seen in Figures 1 and 2, each of which has the handle 10 at its front end and is threaded at the other end 11, said threaded end passing through the stationary threaded member 12.

13 designates a collar fast on the rod 9, which is positioned between the ears 14, which are secured to the upright 3, so that it will be apparent that as either of the rods 9 is rotated by its handle 10, the frame 6 and its adjuncts can be readily tilted in the desired directions to obtain the desired inclination, at either angle to the vertical.

As will be understood from Figure 1, there are two of the actuating rods 9 located on opposite sides of the frame-work and each rod carries a sprocket wheel 9$^x$, around which passes an endless sprocket chain 10$^x$, so that the rotation of either handle 10 seen in Figure 1, will effect the rotation of the opposite rod 9, in unison so that both rods will be simultaneously moved forward or back by reason of the threaded engagement of their rear ends with the stationary blocks 12. The engagement of the collars 13 which are fast on the rods 9 with the lugs or ears 14, which are fast on the uprights, will as is obvious, cause the inclination of the frame 6 in the desired direction, it being understood that the construction of collars, ears and threaded rod seen in Figure 2 is duplicated on the opposite side of the machine.

The upright 2 and 3 may be round or square or polygonal in cross section and serve as bearings for the right-hand sleeve 15 seen in Figure 1, and the left-hand sleeve 16, seen in Figures 2, 6 and 9 said sleeves being capable of up and down movement upon their respective uprights or bearings.

The right-hand sleeve 15 is provided with the inwardly projecting ears 17, in which is pivotally mounted the vertical end bar 18 (see Figures 1 and 16), opposite to which is the vertical end bar 19, the tops of said vertical bars being joined or tied together by the upper horizontal bar 20, and the bottom ends of said vertical bars being joined by the bottom horizontal bar 21, said vertical members 18 and 19, and horizontal members 20 and 21 forming a rigid rectangular frame or bridge designated as 22, which is pivoted at its right-hand end to the ears 17 of the sleeve 15 by the pin 23 passing through said ears and through the horizontal slot 23$^x$ in the right-hand bar 18 (see Figure 16). The frame 22 at its left-hand is pivoted or fulcrumed upon the shaft 24, mounted in the ears 25 (see Figure 6).

The outer end edges 18$^x$ of the end bar 18 and the edges 19$^x$ of the end bar 19 are inclined or converge outwardly, so that the ends of the frame 22 may have sufficient clearance with respect to their supporting sleeves, when an end of said frame is inclined to the horizontal, as will be hereafter explained.

The upper and lower bars 20 and 21 of the frame 22, serve as ways or supports for the cross-head 26, which is composed of the upper and lower horizontal sleeves 27 and 28, which are joined by the uprights 29, whereby a very rigid head is produced.

About midway of said uprights, I locate the front and rear horizontal extensions 30 and 31, whose extent will be understood from Figure 6 and in which are located the parallel horizontal slots or ways 32, see Figure 16, in which are movably mounted the parallel carrier bars 33, which are tied together at their front and rear ends by the front and rear blocks 34 and 35 (see Fig. 20). By the extensions 30 and 31 on the cross-head uprights 29, elongated bearings are provided for the carrier bars 33 so that the carrier bars, and their adjuncts will be effectively supported in both their extreme and intermediate portions.

The front block 34 terminates in the vertical head 36, best seen in Figure 11, which has the rotary head or member 37 mounted therein. The upper portion of the head 36 has the recess 38, in which is received the worm gear 39 which is fast on the rotatable member 37 and is in mesh with and actuated by the worm 40 mounted on the shaft 41, which rotates in the bearing 42 on the block 34, and the end bearing 43, carried by the block 35, (see Fig. 20) 44 and 45 designates the top and bottom plates carried by the head 36, which constitute a pivoted pneumatic carriage and are tied together by the two rear bolts 46 and the three front bolts 47. The lower end 48 of the head 37 is stepped into a hole or bearing in the bottom plate 45, while its upper end 49 is of reduced diameter and extended through a bearing in the top plate 44. 50 designates a rod turnable in and passing through the head 37, and having the handle 51 whereby said rod can be axially rotated, so that its lower offset terminal 52, can engage the central slot 53 of the plate 54, which is slidably mounted on the bottom surface of the bottom plate 45. The plate 54 has the slots 55 therein, (see Figure 10), which extend at right angles to the slot 53, and through said slots pass the screws 56, which serve to guide the plate in its movement from left to right, said plate being further guided by the contact of the screw 57 with the rear edge 58, as seen in Figure 10. The plate 54 has a depending flange 59, which has slots 60 therein, which are engaged by the rear free ends of the rods 61, whose front ends are forked and bent inwardly as at 62 to engage the bush chisels 63, whose shanks 64, are impacted upon by the hammering pistons 65, contained in the pneumatic tool cylinders 66, which are held in position by the upper and lower extensions 67 and 68 which are positioned within the upper and lower plates 44 and 45, as will be understood from Figure 11. It will be understood that any conventional stone dressing pneumatic tool may be employed, and any detailed description thereof is therefore unnecessary. I desire to call particular attention to the employment of a plurality of pneumatic stone dressing tools 66, three being shown in the present instance, and to the manner in which they are mechanically held and controlled, since by my construction a very much greater area can be expeditiously acted upon than by a single hammer, and by means of the handle 51, the rod 50, the offset bottom terminal 52, and the sliding plate composed of the members 54 and 59. I am enabled by the actuation of the handle 51, to actuate the plate 54 to the right or left and to actuate in unison the bush chisels to the right or left, through the medium of the connections 61 common to said bush chisels and slotted pendant plate 59, as will be understood from Figure 11, and the bottom plan view thereof, seen in Figure 10. In the standard surfacers in commercial use, either the tool carrier and the carrier bar in the sliding bar surfacer are manually adjusted as a unit with respect to the standard, or in the crane surfacer type, the tool holder is carried by a trolley carriage movable on the carrier bar, no provision being made for a power hoist or power drive, or for the automatic mechanical control such as I employ and which will now be described.

Any suitable source of power or prime motor may be employed for driving the main shaft 69 seen at the left of Figures 1 and 2, but I preferably employ the electric motor 70, which is supported on the shelf 71. On the shaft 69 is mounted the pinion 72, which is in mesh with the gear 73, mounted on the left hand end of shaft 74 which revolves in suitable bearings.

75 designates a pulley mounted on the shaft 74 about midway of its ends around which passes the belt 76, which drives the pulley 77, mounted on the shaft 24, which has already been referred to as forming the pivotal connection between the members 19 and 25, (see Figure 6).

The shaft 24 (see Figs. 6, 9, 17) carries the driving friction cone or cones 78, whereby the driven cone 79 is rotated which is mounted on the shaft 80, which revolves in suitable bearings.

81 designates a pinion mounted on the shaft 80 and in mesh with the gear 82, mounted on the shaft 83, the right-hand end of said shaft having its bearing in the plate 84 (see Figure 1), which is attached to the right-hand upright member 18, of the frame 22. The shaft 83 carries the worm 85 which is in mesh with and drives the worm gear 86 on the shaft 41, said gearing being enclosed by the housing 87, as will be understood from Figures 1, 6 and 13. It will be apparent from Figure 17 that the rotation of the shaft 80, through the gearing 81 and 82 effects the rotation of the shaft 83, and by the gearings 85 and 86, the rotation of the shaft 41 is effected and by the rotation of the latter shaft and the gearing 39 and 40 and the intermediate connections, the actuation of the tool carriers (see Figures 10 and 11) in the desired direction is effected.

Reverting now to the shaft 74, seen at the bottom of Figures 6 and 9, it will be seen that the left-hand end thereof is provided with the driving friction cone or cones 88, whereby the driven cone 89, mounted on the shaft 90 is driven, said shaft carrying the bevel pinion 91, which is in mesh with and drives the gear 92, mounted on the shaft 93 (see Figures 6, 16 and 19) on which latter is mounted the sprocket wheel 94, which actuates the endless sprocket chain 95, see Fig. 19. The underside of the bottom horizontal bar 21 is hollow as seen in Figure 16, and form a receptacle or housing for the endless sprocket chain 95 and the driving sprocket wheel 94 and the idler sprocket wheel 96.

The sprocket chain 95 is secured by the bolt or the like 97 to the bottom of the lower member 28 of the cross head 26, so that it will be apparent that by the rotation of the shafts 90 and 93, the driving sprocket wheel 94 will be rotated and as the endless sprocket chain 95 is actuated, by reason of its fixed connection to the cross head at the point 97, in either direction, the cross head 26 and its adjuncts will be actuated either to the right or left as may be desired, and it will be apparent that the hollow lower bar 21, forms a convenient housing for the reception and concealment of the two sprocket wheels and the coacting sprocket chain. Referring again to the lower portions of Figures 6 and 9, it will be seen that the right hand end of the shaft 74 is provided with the driving cone or cones 98, whereby the driven cone 99 and its shaft 100 is driven, see Figure 18.

101 designates a pinion on the shaft 100, which is in mesh with the gear 102, whereby the shaft 103 is driven, said shaft having its middle bearing on the cross head 26 and its extreme right-hand bearing in the plate 84. 104 designates a pinion carried by the shaft 103 and in mesh with the teeth of the rack 105 which is located within the carrier bars 31, and has its ends secured to the end blocks thereof at the points 106 and 107 (see Figure 20), it being apparent that as the shafts 100 and 103 are rotated, the engagement of the pinion 104 with the rack 105 will actuate the rack and the carrier bars 33 and their adjuncts to and from the operator, the operation being clearly understood from Figures 18 and 20.

The mechanism for effecting the forward and back movement of the carrier bars and the pneumatic tools carried thereby will now be described.

The lever or post 108 having the handle 109, seen in Figures 1, 2, 3, 4, and 5, is pivoted at its lower end at 110 to the upright member 111 of the angle iron 112, whose horizontal member 113, has the trunnions 114, which are mounted in the ears 115. By this construction the post 108 is permitted to have a movement forward and back or to the right or left. The forward and back movement of the post 108 controls the forward and back movement of the carrier bars 33 and the pneumatic tool carried thereby and when the post 108 is moved or rocked towards the operator, the carrier bars move towards the operator, and when the post is rocked away from the operator the carrier bars and pneumatic tools move backwardly away from the operator by reason of the following mechanism.

The plate 116 has the front and rear guide slots 117 and 118, (see Figs. 3 and 21) whose walls engage the front and rear screws 119 and 120, and thus permit said plate to slide only in a rectilinear line to and from the operator. The plate 116 has a transverse slot 121, through which the post 108 passes. The rear end of the plate 116 has the front end of the link 122 pivotally connected thereto, the rear end of said link being connected to the rock arm 123, which is fast to the upright rod 124. 125 designates an arm splined to the rod 124, so that it can travel up and down with the mechanism contained in the cage 126, said arm being retained always in horizontal position between the plates 127 and 128, see Figures 9 and 14. The arm 125 has a downwardly deflected terminal or finger 129, which pivotally engages one end of the lever 130, fulcrumed at 131, the other on left-hand end of said lever having a downwardly extending terminal or finger 132, which is pivotally connected to the lever 133 fulcrumed upon the rod 134 (see Figures 9 and 21). The lever 133 has an extension 135, which has its extent of movement limited by the pin 136, it being apparent that the extent of movement of said lever in the opposite direction is limited by the pin 137.

The lever 133 is fast on the fulcrum rod 134, as is also the elbow lever 138, composed of the arms 139 and 140. The arm 139 has pivotally connected thereto, one end of the link 141, the other end thereof being pivoted at 142, to one end of the shifting lever 143, fulcrumed at 144. The outer end 145 of the shifting lever engages the groove 146 of the contiguous friction driving cone 98 (see Figure 9) which is splined on the shaft 74, as indicated at 147 in Figure 18. The arm 140 has pivotally connected thereto at 148 (see Figures 6 and 9) one end of the rod 149, the outer or right-hand end of said rod having a sliding bearing in the rear of the plate 84, carried by the bridge 22, (see Figure 16). The rod 149 carries at its right hand end the tappet 150, having the spring 151, which abuts against the collar 152 held in position by the set screw 153.

The opposite or left-hand end of the rod 149, also carries the tappet 154 having the spring 155 which abuts against the collar 156, held in position by the set screw 157. It will be seen from the foregoing that when the post 108 is rocked or pulled in a right line towards the operator, the plate 116 and rod or link 122 will be also pulled towards the operator and by the rock arm 123 the rod 124 will be rotated. Through the medium of the connections 125, 130, 133, 134, 141 and 143, the left-hand driving cone 98, seen in Figures 6 and 9 will be caused to engage the driven cone 99 and the direction of rotation of the shafts 11 and 103, and the pinion 104 will now be such that the engagement of said pinion with the rack 105 will cause the carrier bars and pneumatic tools to travel towards the operator, their direction of movement being the same as the inclination of the lever 108.

Upon moving the post 108 to a vertical position the position of the cones 98 will be as seen in Figures 6 and 9, the driven cone 99 will be stationary and the carrier bars and pneumatic tools will be stationary. Upon moving the post 108 in a right line backwardly or away from the operator, through the medium of the connections above referred to, 125, 130, 133, 134, 141 and 143, the right hand driving cone 98 seen in Figures 6 and 9, will engage the driven cone 99, and the carrier bars 33 and pneumatic tools will recede from the operator or move backwardly.

It will thus be apparent that the rocking or oscillation of the post or control device 108 towards or away from the operator imparts motion in the corresponding direction to the pneumatic tools or stone working implements.

Referring now to the right hand end of Figure 3, 158 designates a plate resting upon the plate 116, and provided with the oppositely located or right and left-hand slots, 159 and 160 see also Figure 22, whose walls engage the screws or pins 262 and 263.

161 represents a central slot which extends at a right angle to the slots 159 and 160, the post or lever 108 passing through said central slot, and the construction being such that when the lever is moved towards or away from the operator it actuates only the bottom plate 116, since the lever has a free movement longitudinally of the slot 161. When however, the lever 108 is rocked by the operator standing in front of the machine from right to left, the plate 158 is actuated and the plate 116 remains stationary, since said lever can move freely longitudinally of the slot 121. The actuation of the plate 158 actuates the elbow lever 162, which is fulcrumed at the point 163 (see Figures 3 and 22), and consists of the two limbs 164 and 165, the latter being pivotally connected to the arm 166 of the plate 158 at the point 167.

168 designates a link whose front end is pivotally connected to the arm 164 and its rear end to the rock arm 169, which is fast on the upright rod 170.

Both the upright rod 170 and the adjoining parallel rod 124 already described pass through and are rotatably mounted in the stationary lower plate 171 and have their lower ends stepped into suitable bottom bearings in the block 172 (see Figure 3) below the plate 171 (see at the lower left hand end of Figure 1). The middle portions of said rods are guided in the horizontal stationary plates 127 and 128, (see Fig. 14) and their upper ends have their bearing in the horizontal stationary top plate 173, which is secured to the left hand top end of the frame 6. 174 designates a laterally extending arm, fast on the rod 170, (see Figures 14 and 22), and having a downwardly deflected terminal 175, which pivotally engages one end of the lever 176 which is fulcrumed at 177.

The outer or left hand portion of the lever 176 (viewed from the front of the machine) has an offset 178, (see Figures 9 and 22), and its outer end 179 engages a notch in the horizontal arm 180, which is fast on the upright shaft 181.

The vertical shaft 181 has fast thereon a lower horizontal inwardly projecting arm 182, which engages the groove 183 of the sleeve which carries the two driving friction cones 88 (see Figures 6 and 22).

The shaft 181 carries fast thereon the arm 184, which is above the arm 182 and projects at a right angle to the arm 182, and engages a notch in the side of the sliding plate 185 (see Figures 6, 9, and 22) which is reciprocated to the right or left of the operator, (standing in front of the machine) in a guide plate or ways 186 of any suitable character.

The plate 185 has pivotally mounted thereon the lever 187, which is fulcrumed at the point 188 and provided with the arm 189 which extends to the right and is adapted to be rocked towards the right-hand notch 190, the spring 198 pressing said arm towards said notch. The left hand arm 191 of the lever 187 is held in contact with the contiguous end of the latch pin 192 by the spring 193, said latch pin being secured to the free end of the spring 194 by the screw 195 (see Figures 9, 14 and 15). The spring 194 is secured in fixed position by the screw 196.

The arm 197 of the lever 192 projects at substantially a right angle to the arms 189 and 191 and has pivotally connected thereto one end of the rod 199 which is supported at its outer or right hand end by the plate 84 and has its intermediate portions guided in the ears 200 or the like, which are attached to the rear extensions 31, see the upper left hand portion of Figure 6, Figure 26 and Figure 12.

The rod 199 carries the left hand tappet or block 201 and the right hand tappet or block 202 which are capable of adjustment along the rod 199 by the loosening and tightening of the set screws 203, or the like.

The extensions 31 carry on the outer rear surfaces thereof the resiliently mounted fingers 204 and 205 which are pivotally supported at the points 206 and 207 respectively, the pivots on which said fingers are mounted being provided with suitable springs as 208, indicated in dotted lines in Figure 6, whereby said fingers normally always assume the position seen in Figures 6 and 26, but are capable of movement under tension towards each other at the proper intervals.

Referring now to Figures 1, 2, 6, 10, 12 and 20, 209 designates a rod which is located parallel to the left hand bar 33 and has its forward end secured to the bracket 210 by means of lock nuts or the like.

The rod 209 extends parallel with the left hand bar 33 and has its rear end secured to an extension of the rear plate or block 35 at the point 211, so that it will be understood that as the carrier bars 33 move forward and back, the rod 209 will move in unison therewith as a unit.

The rod 209 has secured thereto the forward and rear tappets 212 and 213, which are capable of longitudinal adjustment with respect to the operating mechanism seen in Figure 12 and are held in desired position by means of set screws 214, which will be understood from Figures 12 and 26.

Referring now to Figures 12 and 26, the rear end of the left hand extension 31 has secured thereto a bar 215, in which the sliding locking pin 216 is mounted, said pin being at all times pressed down by its contact with the free end of the spring 217, which is secured to a fixed point 218.

The pointed end 219 of the pin engages one or the other of the notches 220 and 221 at the top, which are located in the curved or convex surface 222 of the plate 223, which is pivotally mounted at the point 224.

The plate 223 has secured to its lower portion the spring 225 whose lower end is fixed to said plate at the point 226.

The spring 225 acts as a resilient finger whose lower end is fixed at the point 226 upon the plate 225 and whose upper end is capable of free movement between the pins or stops 227, it being apparent from Figure 12 that the upper end of said spring 225 is in the path of the tappets 212 and 213, so that if either contacts with the upper end of said spring, a movement will be imparted in the desired direction to the plate 223 and its adjuncts.

The lower end of the plate 223 is provided with the pendant finger 228 which is in proximity to the rod 149 already described, which carries the tappets 150 and 154, see Figure 6.

The plate 223 at its lower end has one end of rod 229 secured thereto, the other end of said rod being secured to the plate 230, which is pivoted at 231, to the outer or rear end of the right hand extension 31 and is provided with the pendant finger 232, which is located on the side of the rod 149 opposite to the finger 228, as will be understood from Figure 12 and Figure 26.

233 designates a handle piece, seen in Figures 1, 2, 9, 14 and 23, said handle projecting from the left hand end of the machine and having a deflected portion 234 having its bearings, as indicated at 235 in Figure 9. The portion intermediate the bearings 235 is offset as indicated at 236, see Figure 22, said offset portion being located under the portion 237 of the lever 176, so that when said handle 233 is raised the offset portion 236 will lift the tongue 179 out of engagement with the horizontal arm 180.

The rear end of the portion 234 is provided with an offset terminal 238 which engages the slot 239 in the horizontal arm 240 of the lever 241 which is fulcrumed at the point 242, see Figure 14, it being apparent from Figure 9 that said lever 241 is positioned within the spring 194, which is slightly bowed to accommodate it.

Referring now to the third function of the control lever 108 seen at the lower left hand portion of Figure 1, we have now described two functions of said lever and its adjuncts, it being apparent that when the latter is moved towards and away from the operator, the pneumatic tools 66 and their adjuncts will move towards and away from the operator.

By the right and left hand movements of the control lever 108, the carrier bars and their pneumatic tools will move to the right and left of the operator.

There is a third or axial movement, however, of the lever 108, which effects the operation of the stone working implements 63 which will next be described.

Referring to Figures 5 and 24, it will be seen that the ears 115 are joined by a bottom wall 243 which is capable of pivotal or rotary movement upon the bolt or fulcrum 244, said base 243 being continued to form the offset arm 245.

246 designates a link whose forward end is pivotally connected with the arm 245 at the point 249 and whose rear end is pivotally connected to the arm 247 which is fixed upon the upright rod 248.

The upright rod 248 is best seen at the left-hand of Figures 3, 4, 6, 9 and 24, and has its lower end stepped into a suitable bearing, as indicated at 250, see the bottom of Figure 2. The upper end of the rod 258 is rotatably mounted in the horizontal top plate 173, and said rod is further guided at its lower portion by a bearing in the horizontal plate 171, see Figures 1 and 2, and about midway of its ends, said rod is further guided by passing through the horizontal plate 252 seen at the right of Figure 2, upon which is supported the guide plate 253, which is bowed or bulged so as to form a chamber, within which is the horizontal arm 254, which is provided with a tongue 255.

The tongue 255 engages a notch in the sliding plate 256, which is supported upon the plate 252, see Figures 2, 6, 9 and 24. The plate 256 has a movement towards and away from the operator, assuming the operator to be standing in front of the machine, and is guided in its movement by walls of the slots 257 engaging the screws 258, the plate being resiliently held by the springs 259 bearing against its ends, as will be understood from the right of Figures 6 and 9.

The forward end of the plate 256 has the angular finger 260 projecting therefrom, which engages the groove 261 of the sleeve, which carries the friction cones 78.

It will be understood that the sleeve which carries the two friction cones 78 is splined to the shaft 24 so as to be movable longitudinally thereof, which is the same construction as is present in the case of the friction cones 98 and 88 already referred to, the sleeves which carry all of said cones being splined to their respective shafts, whereby said cones are movable longitudinally of the shaft but rotate in unison therewith.

It will thus be seen from the foregoing, particularly by a reference to Figures 1, 4, 5 and 24, that when the lever or post 108 is rotated axially by means of the handle 109, the arm 245 will be rocked, and by reason of the link or rod 246 and its connection with the arm 247, an axial movement will be imparted to the upright rod 248 and to the horizontal arm 254 fast thereon. By reason of the engagement of the tongue 255 of said arm 254 with the slot in the plate 256, it will be apparent that a sliding movement may be imparted to said plate, see Figures 6 and 9, and said sliding movement by reason of the finger 260, will move one or the other of the driving cones 78 into frictional contact with the driven cone 79, it being apparent that as the shaft 80 is rotated to the right or to the left, it will through the medium of the intermediate connections, (see Figure 17,) 81, 82, 83, 85, 86 and 41, impart rotation in the desired direction to the shaft 41, and the shaft 41 through the medium of the gearing seen in Figure 11 will impart movement to the members 37, 44, 45, 66, and 63, thereby actuating the stone cutting implements 63 in the desired direction.

It will thus be seen from the foregoing that the control lever or post 108 has three functions. When the same is moved towards or away from the operator, the carrier bars and the pneumatic stone cutting implements carried thereby will move towards and away from the operator following the direction of movement of the lever 108. When said lever 108 is rocked to the right or the left, the cross-head, carrier bars, pneumatic tools and the stone cutting implements, will move in a corresponding direction to the right or to the left, and when said lever 108 is rotated axially, the stone working implements will be automatically and mechanically actuated in unison in the desired direction without further attention on the part of the operator.

It will be further apparent that by reason of the pivotal connection of the bottom of the lever 108 with the other coacting elements, that this axial movement of the lever may be imparted thereto when said lever is in either of its forward or back or sidewise positions, so that the desired mechanical actuation of the stone working implements may be imparted thereto in any position as the same may have moved forward or back or sideways with respect to the work.

This feature of my invention, wherein I effect the automatic mechanical control, forward and back and sideways, of the stone working implements, together with the simultaneous actuation of said stone working implements from a single control lever, is one of great importance and value in a device of this character, since the desired control is obtained from a single actuating mechanism, and, in addition, the actuation of the lever requires no especial thought or attention on the part of the operator, since when the lever 108 is pulled towards the operator, the stone working implements advance towards the operator. When said lever is pushed away from the operator, the stone working implements follow the movement of the lever and recede from the operator, and when said lever is rocked to the right, the stone working implements travel to the right, and when it is rocked to the left, the stone working implements also travel to the left.

It is well known that in devices of this character, the weight of the bridge, crosshead, carrier bars, the pneumatic tools and their adjuncts is such that it is difficult for the operator to adjust the same manually, without recourse to counterbalancing devices of some character, and in my invention, I have made provision by the employment of a single control lever, for effecting the operation of a power hoist, according to requirements, which will now be described, reference being had to Figures 1, 2, 3, 23, and 25.

The control lever 264 is pivotally mounted at 265 at its lower end upon a suitable support, see the lower right-hand portion of Figure 2, and is guided by a plate 267, so that said lever has only a movement towards and away from the operator.

The lever 264 passes upwardly through the plate 267, see Figures 2, 3 and 23, said plate being provided with the front slot 268 and the rear slot 269. The walls of the rear slot 269 engage the pin or screw 270 while the walls of the front slot 268 engage the screw or pin 263 already referred to, it being apparent that said screw 263 serves as a common guide member for the slot 160 in the plate 158 and for the slot 268 in the plate 267, the general arrangement of the parts being clearly understood from Figure 3.

The rear of the plate 267 has the front end of the link 271 connected therewith at the point 272, while the rear end of the link 271 is pivotally connected to the arm 273, which is fast on the vertical upright rod or shaft 274, which has its lower end stepped in suitable bearings in the block 172, if desired, and its upper end rotatably mounted in the upper horizontal plate 173, as will be understood from Figures 1 and 2.

The shaft 274 has the arm 275 fast thereon provided with a tongue 276, which is adapted to engage the groove 277 of the sleeve which carries the driving cone pulleys 278, said sleeve and driving cone pulleys being splined upon the shaft 24 so as to be capable of longitudinal movement thereon and being also rotatable in unison with said shaft 24. The two driving cones 278 are shown dotted in Figures 6, and it will be understood that they are located directly under the driven cone 279 seen in Figure 7.

The general arrangement of the driving and driven cones 278 and 279 will also be clearly understood from Figure 25, it being apparent that the driven cone 279 is mounted on the vertical shaft 280, which revolves in suitable bearings 281, see Figure 7.

282 designates a ratchet wheel mounted above the driven cone 279 and engaged by the free end of the pawl 283, whose opposite end is suitably secured to a fixed point, said pawl preventing improper forward movement of said ratchet wheel and driven cone 279, as is evident.

It will be apparent that as one or the other of the driving cones 278 engage the contiguous surface of the driven cone 279, the shaft 280 will be rotated, and by means of the pinion 284 meshing with the gear 285 mounted on the shaft 286, the latter will be rotated. The rotation of the shaft 286 rotates the gear 287, which is in mesh with the gear 288. The gears 287 and 288 are positioned above the horizontal top plate 173 and the gear 288 is mounted on the upper end of the feed screw 289, see Figures 2 and 25. The feed screw 289 passes through a nut 290, see Figure 7, which is secured in a projection carried by the left-hand sleeve 16, which slides on the left-hand upright 3. The upper end of the rod or shaft 286 has its bearing in the horizontal top plate 173, as does also the upper end of the feed screw 289, and the lower end of the latter is stepped in a suitable bearing, which I have deemed it unnecesary to show or describe, as will be understood from the left-hand end of Figure 1, and said lower end of the feed screw is provided with a bevel gear 291, which is in mesh with the bevel gear 292 carried by the clutch member 293, see Figures 8 and 25. The clutch member 293 is provided with teeth 294, which engage the teeth 295 of the clutch member 296, which is splined upon the lower horizontal shaft 297. The sleeve-like clutch member 296 splined upon the shaft 297 has a groove 298 therein, which is engaged by the fork 299 of the shifting lever 300, which is fulcrumed at the point 301, the relative position of said shifting lever being understood from the lower left-hand portion of Figure 1 and from Figures 8 and 25.

The right-hand end of the shaft 297 has mounted thereon the bevel gear 302, which is in mesh with the bevel gear 303 mounted on the lower end of the feed screw 304, which has its bearing in the top plate 305, see the upper right-hand portion of Figure 1. The lower end of the feed screw 304 is stepped in a suitable bearing in the plate 306, see the lower right-hand portion of Figure 1, and it will be understood that the horizontal shaft 297 revolves in suitable bearings which it is not necessary to describe in detail.

The right-hand feed screw 304 passes through a nut 307, which is mounted in a lug on the rear of the right-hand sleeve 15. The relative position of the nuts 290 and 307 with respect to the sleeves 16 and 15 will be understood from Figure 7 and the diagrammatic view in Figure 25, it being apparent from the foregoing that the two feed screws 289 and 304 by means of their communicating mechanism, rotate in unison in either direction, and that as they rotate, the engagement of said feed screws with their respective nuts 290 and 307 will cause the sleeves 15 and 16 and their adjuncts simultaneously to be raised and lowered.

Referring now to the ratchet wheel 282 seen in the vertical sectional view in Figure 7 and in the horizontal sectional view in Figure 9, it will be apparent that so long as the stationary pawl 283 is in engagement with the teeth of said ratchet wheel, as seen in said figures, the shaft 280 will be prevented from rotation in a direction towards the end of said pawl.

When it is desired to disengage said pawl from the ratchet wheel, I employ the mechanism best seen in Figures 1, 7, 9, 27 and 28, and comprising the handle 308 mounted on the outer end of the rod 309, said rod 309 having its inner end secured to the threaded stem 310, which is threaded into the stationary nut 311.

The inner end of the threaded stem 310 is secured to the upper portion of the bar or lever 312, which is pivotally mounted on the fulcrum 313, see Figure 7, the lower end of said lever 312 being in contact with the free end of the spring 314, whose opposite end is secured to the fixed point 315, the tension of the spring 314 causing the upper portion of the lever 312 normally to contact with the pin or abutment 316, see Figures 7 and 27.

When the threaded stem 310 is caused to advance to the left of the position seen in Figure 7, it will be apparent that by reason of its connection with the lever 312, the upper portion of the latter will move to the left of the pin 316 seen in Figure 7, thereby moving with it the finger 317, whose forward end will engage the pawl 283 in its path, whereupon said pawl will be disengaged from the teeth of the ratchet wheel 282. The finger 317 has the member or lever 318 fulcrumed thereon at the point 319, said member 318 carrying the movable pawl 320 seen in Figure 9, and it will be apparent that as the lever 312 is rocked and the finger 317 approaches the pawl 283, the free end of the pawl 320 will move against the inclined strip 321 and be deflected out of engagement with the teeth of the ratchet wheel 282, as will be clearly apparent from Figures 7 and 9, in which position both the stationary and movable pawls 283 and 320 will be out of engagement with the ratchet wheel 282.

The heel 322 of the member or lever 318 is pressed upon by the spring 323, so that the pawl 320 is always properly held in position with respect to the ratchet teeth of the ratchet wheel 282 when the parts are in position seen in Fig. 9, so as to rotate the ratchet wheel and shaft 280 as the lever 312 is rocked by the mechanism next to be described.

The shaft 24 has a pinion 324 fast thereon which meshes with and drives the gear 325 mounted on the shaft 326, said gear carrying the eccentric pin 327, which as it rotates engages the wall 328 of the lever 312, thereby rocking the upper portion of the lever to the left of the position seen in Fig. 7, whereupon the movable pawl 320 will engage the teeth of the ratchet wheel 282 and intermittently actuate the same, so as to impart a step by step movement to the shaft 280, gears 284 and 285, the shaft 286 and gears 287 and 288, whereby the feed screws 289 and 304 are actuated in the desired direction.

When the pawls 283 and 320 are out of engagement with the ratchet wheel 282, which is effected by the rotation of the screw 310, it will be apparent that the hoisting mechanism can be operated in either direction to raise or lower the cross-head, carrier bars and the pneumatic tools by the actuation of the lever 264 in the desired direction.

The detailed operation is as follows, it being apparent from the foregoing that in my invention, I have made provision for either the manual or automatic control of all the movements and conditions which in practice may be required or may be expected of a stone surfacing machine, the various functions of which my machine is capable being described under the following captions:—

*The plurality of pneumatic hammers.*

The pneumatic surfacers now in commercial use on the market employ but a single pneumatic hammer, which is manually actuated towards or away from the operator, and in addition supported so as to be rotatable about the supporting standard of the surfacer.

It is obvious that the amount of work which can be done by a single pneumatic hammer is of a limited character, and as it is desirable in machines of this character to operate upon a maximum surface or area with a minimum expenditure of time in certain classes of work, it will be apparent that great economy of time and labor is attained by my employment of a plurality of these pneumatic hammering implements.

This feature of my invention obviously does not reside in merely duplicating a single hammer, but in the employment and design of certain novel structural features whereby a plurality of hammers can be effectively supported in position in such a way that they are readily accessible at all times and so that one or more of the hammers can be readily disconnected from its support for the purposes of inspection, replacement and repair at all times.

This I effect by reason of the construction seen in Figures 1 and 11, wherein the loosening of the front and rear bolts 47 and 46 permit the removal of the upper plate 44, so that the pneumatic tools are readily accessible.

It will be obvious that while I have shown three pneumatic tools as being employed in the present instance, two or four or any other desired number of pneumatic tools may be employed, if desired, and it will be obvious that for example with the use of three pneumatic tools, three times the amount of work can be done as compared with the use of a single pneumatic tool.

*The mechanically held and controlled bush hammers.*

It is well known that in the employment of a bush hammer or a plurality of bush hammers which I have shown, it is desirable that the bush chisels impact upon the work or stone to be surfaced at different angles, and I have consequently made provision in the present instance whereby three pneumatic tools and three bush hammers may be employed in conjunction with means for effecting the axial actuation of the bush chisels at the desired intervals, by means of the mechanism best seen in Figures 10 and 11 when taken in conjunction with the mechanism seen in Figures 1, 3, 4, 17 and 24.

Assuming the bush chisels to be in any position with respect to the surfacer frame or to the stone to be dressed, it will be apparent that the axial rotation of the lever 108 in either direction will impart axial movement to the rod 248. This will impart movement to the arm 254, see Figures 24, 6, 9 and 17, and the movement of the arm 254 which is interlocked with the plate 256, will move said plate to the right or the left, whereupon the finger 260 will cause one or the other of the driving cones 78 to engage the driven friction cone 79, whereupon rotation in the desired direction will be imparted to the shaft 80, gears 81 and 82, shaft 83, worm 85 and pinion 86 of the shaft 41, which is mounted on the top of the carrier bars, whereupon the worm 40 mounted on the front of said shaft 41 will engage the gear 39, see Fig. 6, and will cause movement to be imparted to the tool carriage composed of the parts 44, 45 and 37, to the desired extent. By reason of the connections 61 common to the slotted pendant plate 59 and to the bush chisels, the latter can be manually axially rotated in either desired direction by the rotation of the handle 51. This actuation of the tool carriage can be effected and started and stopped and controlled in any position which the carrier bars and their front head may assume with respect to the work or with respect to the frame of the surfacer, which is effected by reason of the novel pivotal connection common to the bottom of the lever 108 and the parts 111, 113, 115, 243 and 245 best seen in Figures 5 and 5<sup>A</sup>.

This is a feature of great importance, since it permits the operator to axially rotate the lever 108 irrespective of whether the latter is in its extreme forward, rear or intermediate positions, or whether it is in its extreme right or left-hand or intermediate positions, and consequently enables the operator to turn the bush chisels in the desired direction at any stage or period of the work.

In the construction shown, when the post 108 is axially rotated, the desired driving friction cone 78 seen in Figures 6 and 9 will instantly engage the driven friction cone 79 so as to instantly effect the rotation of the shaft 41 in the desired direction. The cones 78 and the sleeve which carries them, together with the grooved member 261, are splined upon the shaft 24, so that said cones and their adjuncts are capable of free longitudinal movement upon said shaft, but will always rotate in unison therewith.

I have deemed it unnecessary to show this splined construction in detail, as this will be understood by those skilled in the art, the general arrangement of the parts being clearly apparent from the left-hand portion of Figure 17. When the driving cones 78 are in the position seen in Figures 6 and 9, it will be apparent that they are revoluble in unison with the shaft 64, but as both of the cones 78 are out of contact with the cone 79, no movement will be imparted to the latter or to the shafts 80, 83 and 41 until one or the other of the driving cones 78 is moved longitudinally into contact with the driven cone 79.

It will of course be apparent that other forms of clutches or friction cones may be employed other than those shown in Figures 6, 9 and 17, but I have found the construction shown in said figures to work satisfactorily, since a slight degree of slippage is permitted which is sometimes desirable in devices of this character.

*The pivoted pneumatic carriage.*

The construction of the pivoted pneumatic carriage or holder for the pneumatic tools will be readily understood from Figures 1, 10 and 11, and it will be apparent that the pneumatic tool carriage composed of the plates 44 and 45 seen in Figure 11 and the bolts common thereto, together with the bush chisels, are readily rotated with the projections 48 and 49, and, in addition, the bush chisels themselves 63 are capable of manual rotation in the desired direction by means of the handle 51 seen in Figures 1 and 11.

*The bridge and trolley type construction of frame.*

By reference to Figures 1 and 16, it will be seen that the bridge 22 and the crosshead or trolley construction 26, in which latter the carrier bars and their adjuncts are contained, constitute a frame construction which is not only very rigid and durable, but, in addition, results in a construction which is well adapted for moving the pneumatic hammers over a rectangular surface.

When the bridge 22 seen in Figures 1 and 16 is standing horizontal, it will be understood that the travel of the cross-head, the carrier bars and the pneumatic tools from right to left or towards or away from the operator, will be not only in a horizontal plane, but will be effected in such a manner that the hammers can be accurately positioned during their movement over rectangular surfaces.

*The adjustable bridge.*

By reference to Figures 1 and 16, particularly the left-hand of the latter, it will be seen that the left-hand upright 19 of the bridge member is fulcrumed upon the shaft 24, and that a certain amount of play is permitted by reason of the slot 23<sup>x</sup>. By the employment of the handle 300 seen at the lower left-hand portion of Figure 1 and in Figures 8 and 25, so as to connect or disconnect the clutch mechanism, it will be apparent that the rotation of the right-hand feed screw 304 can be temporarily stopped, and upon the rotation of the left-hand feed screw 289 in the desired direction, it will be apparent that by the engagement thereof with the nut 290, the left-hand sleeve 16 in whose ears 25 the left-hand member 19 of the bridge is pivotally mounted, can be moved upwardly or downwardly, during which period the right-hand sleeve 15 is stationary.

This upward or downward movement of the left-hand sleeve 16 will cause the bridge to incline from right to left or from left to right, as may be desired, and will consequently permit the hammers or stone working implements to work on surfaces which are either horizontal or inclined in either direction to the horizontal, as is evident, which is a feature of great importance and value in a device of this character.

The provision of the slot 23× seen at the right of Figure 16 obviously permits a slight play in the pivotal connection 23, see the right-hand of Figure 1, which permits the bridge to readily assume the desired inclination to the horizontal, according to the requirements of the work to be done.

*The adjustable standards and means for effecting their inclination at an angle to the vertical, towards or away from the operator.*

The standards or uprights 2 and 3, which are tied together by the top and bottom bars 4 and 5, and which are pivotally supported at the points 7 and 8, see Figure 1, constitute a supporting frame-work, which carries the principal operative elements of my device and which can be readily inclined towards or away from the operator, so that the stone working implements may work down hill towards the operator or down hill on an inclined surface inclining away from the operator, which is a very important feature for effecting the surfacing of various kinds of work where the surfaces incline towards or away from the operator.

I am enabled to carry out this feature of my invention by mounting the lower portion of the upright shafts or rods 248, 274, 124 and 170 in suitable stepped bearings or adjustable bearings, which I have deemed it unnecessary to describe in detail, since their structure and mode of operation will be familiar to those skilled in the art, the upper end of said rods or shafts being mounted in the top left-hand plate 173 seen in Figures 1, 2 and 7, it being apparent that the upright shaft or rod 286 and the left-hand feed screw 289 are also mounted in said plate 173, the right-hand feed screw 304 being mounted at its top in the top plate 305, see the upper right-hand portion of Figure 1.

Consequently, when the uprights or standards 2 and 3 are rocked towards or away from the operator, all their adjuncts or coacting mechanism, which is supported in one way or another by the sleeves 15 and 16, will move as a unit towards or away from the operator, this actuation of the standards 2 and 3 being effected by means of either of the handles 10 seen at the lower portion of Figure 1.

It will be apparent that when either of said handles 10 are rotated in the desired direction, the sprocket wheels 9× will be rotated, together with the sprocket chain 10×, and by reason of the threaded connection between the parts 9 and 10, the frame composed of the upright standards 2 and 3 and the horizontal tying bars 4 and 5 will be rocked upon the pivots 7 and 8 in the desired direction towards or away from the operator.

The function of the various controlling mechanisms will not be affected in any way by reason of the inclined position of the standards 2 and 3 and their adjuncts.

It will be apparent that this construction enables the hammers to work on a surface which is horizontal or inclined in either direction.

*The power hoist which allows the operator to raise and lower the hammers and their adjuncts of the machine without stopping the same.*

The rocking of the handle 264 seen in Figures 1, 2, 3 and 23 effects the actuation of the feed screws 289 and 304 to raise and lower the hammers, according to requirements, through the following mechanism:

The lever 264 is movable only in a direction towards and away from the operator, and as will be seen from Figures 3 and 23, actuates the link 271, the arm 273, the upright shaft or rod 274 and the arm 275 fast thereon. The actuation of the arm 275 in either direction through the engagement of the tongue 276 with the groove 277 causes one or the other of the friction cones 278, see the left-hand portion of Figure 25, to engage with the driven friction cone 279.

The arrangement of the power transmission devices will be best understood from Figure 25, and through the medium of the shaft 280, the gearing 284 and 285, the shaft 286, the gears 287 and 288, it will be apparent that the left-hand feed screw 289 will be revolved, and through the medium of the lower gearing and connections, the right-hand feed screw 304 will be revolved in unison. The engagement of the two feed screws with the nuts 290 and 307, which are fast in or carried by the sleeves 16 and 15 respectively, said sleeves being shown dotted in Figure 25, will obviously effect the raising and lowering of said sleeves 16 and 15, whereby the bridge 22, the cross-head and its adjuncts, will be raised or lowered, according as whichever one of the driving friction cones 278 is in engagement with the driven cone 279.

By the operation of the clutch mechanism seen in the lower left-hand portion of Figure 25, as has been hereinabove explained, the right-hand feed screw 304 can be readily rendered temporarily in operative and the bridge 22 and its adjuncts caused to be inclined from left to right or from right to left by the rotation of the left-hand feed screw 289 in the desired direction.

It will be understood that the driving cones 278 best seen in Figure 25, together with the sleeve having the groove 277 therein, are splined upon the shaft 24, so that said driving cones 278 are longitudinally movable upon said shaft but rotate in unison therewith.

Figures 23 and 25, taken in conjunction with Figure 9, clearly show the mechanism for effecting the operation of the power hoist, it being understood that the tongue 276 seen in Figures 23 and 9 engages the groove 277 of the sleeve carrying the driving friction cones 278 seen in Figures 9 and 25.

For the purpose of holding the driving cones 278 in proper position with respect to the driven cone 279, and retaining said driving cones in normal position, I provide the lever 329 seen in Figures 9 and 25, whose forward end engages the groove 277, said lever being pivoted at 330 to the bar or lever 331, which is fulcrumed at the point 332 to suitable supports, which I have omitted from Figure 9.

The lever 329 is held in the desired position by a spring or springs 333 on each side thereof, as will be apparent from Figure 9, it being apparent that when the sleeve with the groove 277 is moved in either direction, it will be instantly restored to its normal position by the tension of the spring 333 against the lever 329. By this construction, the driving friction cones 278 will always normally be out of frictional contact with the driven cone 279 and will be restored to their proper position when the lever 264 is released.

The general collocation of the lever 329, 331 and the spring 333 will be apparent from Figures 9 and 25.

Referring now to Figures 7, 9, 25, 27 and 28, it will be understood that during the operation of the feed screws 289 and 304 in raising and lowering the bridge and its adjuncts, it is desirable that the stationary pawl 283 and the movable pawl 320 be out of engagement with the ratchet wheel 282, which is effected by the manipulation of the screw 310 already described.

When, however, it is desired for the feed screws 289 and 304 to be intermittently actuated, the pawls 283 and 320 are caused to assume the position seen in Figure 9, and by reference to Figures 7 and 27, it will be apparent that as the shaft 24 rotates, the pinion 324 will drive the gear 325 and the engagement of the eccentric pin 327 thereon with the wall 328 of the lever 312 will rock the upper portion of the lever 312 upon its fulcrum 313, so that an intermittent forward and back movement will be imparted to the movable pawl 320, and consequently the engagement of the pawl 320 with the teeth of the ratchet wheel 282 will effect an intermittent or step by step rotation of the ratchet wheel 282, the shaft 280 and through the medium of the gears 284 and 285, the shaft 286 will be rotated and through the medium of the gears 287 and 288, the feed screw 289 will also be rotated, as is evident.

*The power drive.*

The stone surfaces of the standard or conventional type are commonly known as sliding bar surfacers or portable crane surfacers, and in each of them, the stone working implements are manually propelled or actuated and directed upon the work.

In my present invention, I have made provision whereby power is taken from any prime motor, as a small electric motor, which can be readily connected with any suitable source of electricity, whereby the stone working implements are caused to be moved towards or away from the operator or to the right or left of the operator by the control mechanism actuated by the lever 108, so that I am enabled to construct a machine which may be of any size and weight and can carry any number of pneumatic hammers, which can be automatically and mechanically directed and controlled and moved over the surface of the stone.

The power in the present instance is taken from the electric motor 70 seen at the left of Figs. 1 and 2, whereby the pinion 72 is driven, which drives the gears 73, which is mounted on the shaft 74 (see bottom of Figures 6 and 9, also Figures 2, 18 and 19).

The shaft 74 has thereon the two sets of cone pulleys 88 and 98, whose functions have already been described, and at about the central portion of the shaft 74, is the pulley 75 from which the power is taken by the belt 76 directly to the pulley 77 fast on the shaft 24.

The shaft 24 carries the friction cones 78 and 278 thereon, whose operation has already been described, and from the shaft 24, power is also transmitted by the pinion 324 to the gear 325, whereby the ratchet wheel 282 is actuated, as above explained.

It will thus be seen from the foregoing that by my novel construction, a very compact and efficient power transmission is produced, the outer left-hand shaft 74 furnishing under proper control the power for driving and reversing the shafts 90 and 100 and for driving the shaft 24, and from the latter shaft, power is obtained for driving and reversing the horizontal shaft 80, which effects the turning of the tool carriage and the vertical shaft 280, which effects the actuation of the vertical feed screws or hoisting mechanism.

It will thus be seen that by my novel construction of power drive, I am enabled to construct a machine of any size and weight, and carrying any number of hammers, which may be moved over the surface of the stone under full control of the operator, and I further locate the power plant in a relatively small compass at one end of the surfacer within the cage 126.

*The operation of the hand controlled lever.*

The hand controlled lever 108 having the triple functions above described is another important and novel feature of my invention, since by it I am enabled by a single lever to control the movement of the hammers to the right or left and backward or forward, as well as the turning of the brush chisels of the hammers to the right or left, at any desired point.

It will further be noticed that the movement of the hammers is always in the same direction as the lever 108, that is, when the lever is rocked towards the operator, the hammers advance towards the operator, and when the lever is rocked backward or away from the operator, the hammers move away from the operator.

In like manner, when the lever 108 is rocked to the right, the hammers move to the right, and when it is rocked to the left, the hammers move to the left.

These are novel and important features of my invention, since all these various movements are controlled from the single lever 108, and, in addition, said single lever in whatever position it may assume, upon being turned axially, will automatically effect the actuation of the tool carriage in the desired direction.

As will be understood from Figure 3, the employment of the lever 108 in conjunction with the slotted control plates 158 and 116 permits of a very compact assembly of the control mechanism and enables a single lever to effect the control of all the movements required of the hammers, the hoist control being effected by the lever 264 in proximity to the lever 108.

*The automatic control whereby the hammers are caused to move over a rectangular area of any width within the limit of the machine.*

It will be understood from reference to Figs. 22, 6 and 9, that when the lever 108 is rocked to the right or the left, axial movement is imparted to the upright rod 170, and thence by the connections 174, 176, 180 and 181, the arm 182 is rocked and one or the other of the driving cones 88 engages the driven cone 89, and thence by the connections 90, 91, 92, 93 and 94 (see left of Fig. 16) the cross head 26 is moved from left to right or vice versa.

The manual control of the foregoing elements is obviously effected by the lever 108. When the automatic operation of the hammers is desired, the handle 233 is raised, whereupon the portion 236 (see Fig. 22) lifts the tongue 179 out of engagement with the arm 180, and it is obvious that in this position, any right or left-hand movement of the lever 108 will have no effect upon the arm 180, the vertical shaft 181 and the arm 182, which latter actuates the friction cones 88 (see Figs. 6 and 9).

Assuming now that the cross head 26 and its adjuncts is moving to the right on the bridge 22, the finger 205 (see Figs. 26 and 6) will hit the tappet 202 and move the latter and the rod 199 to the right. A pull to the right will be exerted on the lever 187 and also on the plate 185, whereupon the arm 184 will be rocked, also its shaft 181 and the arm 182 (see Fig. 6) and the left-hand driving cone 88 will engage the driven cone 89 and the direction of rotation of the shaft 90 will be reversed and the cross head 26 and its adjuncts will move to the left of the operator.

As soon as the left hand finger 204 hits the left-hand tappet 201, (see Figs. 6 and 26), the rod 199 will be moved to the left, rocking the lever 187 and moving the plate 185 to the left. Through the medium of the arm 184, the shaft 181 and the arm 182, the cones 88 will be moved to the left of the position seen in Fig. 6, and the right-hand driving cone 88 or the one nearest the operator, will engage the driven cone 89 and the direction of rotation of the shaft 90 and its adjuncts will be reversed.

By the foregoing means, the automatic lateral or sidewise movement of the cross head, carrier bars and pneumatic tools is effected.

The automatic forward and back movement of the carrier bars and their pneumatic tools will now be described.

As has already been explained, the manual control of the forward and back movement of the carrier bars and pneumatic tools is effected by the lever 108, plate 116, link 122, arm 123, upright rod 124, arm 125, lever 130 and arm 133, shaft 134, arm 139, link 141 and arm 143, whereby one or the other of the driving cones 98 engages the driven cone 99 (see Figs. 21, 18, 6 and 9). If the plate 223 is turned into the position seen in Figs. 12 and 26, it will be seen that the member 228 is in proximity to the shifter rod 149, and in the path of the left-hand collar 154. As the cross head and carrier bars move to the left of the operator, the member 228 (which is below and concealed by the bar 215 in Fig. 6 but seen in Figs. 12 and 26) hits the collar 154, compresses the spring 155 and then moves the tappet 156 and the rod 149 to the left, whereupon through the medium of the connections 140, 139, 141 and 143, the right hand driving cone 98 (or the one nearest the operator) seen in Figures 6 and 9, comes in contact with the driven cone 99 and the direction of rotation of the shaft 100 and its adjuncts will be such that the carrier bar and the pneumatic tools carried thereby will move backwardly or recede from the operator.

As the carrier bars 33 move backwardly, the rod 209 moves as a unit with them, and after said carrier bars and rod have moved rearwardly to a desired or predetermined extent, the tappet 212 hits the vertical spring member 235 and rocks the plates 223 and 230 seen in Figure 26, whereupon the members 232 and 228 move to the right of the position seen in Figure 26 or towards the front of the machine. The member 232 is now in the path of the collar 150 on the rod 149, see Fig. 6, and when the member 232 hits the collars 150 as the carrier bars and their adjuncts move to the right, it presses the spring 151 against the tappet 152 and thereupon the rod 149 is moved to the right of the operator and through the medium of the connections 140, 139, 141 and 143, the left-hand driving cone 98, seen in Fig. 6 (or the cone which is farthest away from the operator), will be moved against the driven cone 99, whereupon the direction of rotation of the shaft 100 will be such that the carrier bars and pneumatic tools will be automatically moved forwardly towards the operator.

After the carrier bars and the rod 209 have been moved forwardly to the desired extent, the tappet 213 will hit the vertical spring member 225 and will rock the parts 223, 230, 228, 232 and 229 into the position seen in Figure 26 again. The member 228 will now be in the path of the parts 154 and 156 (see Figs. 6 and 26) and the operation above described will be repeated.

The extreme movement of the resilient upright spring member 225 is limited in both directions by the stops 227, and by reason of the springs 151 and 156 and the springs 208, the movement of all the parts is cushioned, so that there is no shock or vibration during the reversal of the movements during the automatic operation of the machine, as is evident.

The pin 216 resiliently locks the plate 223 in its extreme positions, as is evident, it being apparent that the two plates 223, 230 and the rod 229 rock as a unit towards and away from the operator.

The action of the tappets 212 and 213 seen in Figure 26 effects the automatic rocking of the plates 223 and 230 and the automatic positioning of the members 228 and 232 with respect to the collar or tappet 154 and 150. The proper normal position of the resiliently supported fingers 204 and 205 is effected by reason of the stops or abutments seen in Figures 6 and 26, and the operation of the fingers 204 and 205 is cushioned by the springs 208, as is evident.

It will thus be seen from the foregoing that by reason of the automatic control, the extent of the forward and back movement of the pneumatic tools is effected automatically without any attention on the part of the operator, as well as the extent of the movement of the pneumatic tools to the right or left upon the proper adjustment of the tappets 212 and 213 and 152 and 156 and 201 and 202.

The automatic lowering of the hammers, which has already been explained, as will be evident from Figures 7, 27 and 28, has been designed to correspond with the amount being cut off the face of the stone by the stone cutting tools, it being apparent that the stone is cut down within one-half inch of its proper level by the four points of the stone cutting tools, and as a result, no automatic lowering is required when the bush chisels are in operation.

It will consequently be understood from the foregoing that the function of the sliding bar 185 is to automatically shift the beveled gear from one contact position to the other and is held in either contact position by the latch pin, which catches in one of the two notches on the back of the sliding bar 185, Fig. 9, said latch pin being held in the notch by the spring 194. Now when the machine is to be run automatically, the lever 233 is raised, disengaging the rocker arm 178 from the plate 183, also allowing the tension of the spring 194 to be on the latch pin. Now the operator adjusts the collars 201 and 202 to suit the length of the stone being worked on and pulls the said rod to the right or left. If the rod is pulled towards the right-hand end of the machine, the latch pin 192 will catch in the left-hand notch of the sliding bar 185, thereby holding the beveled gears in a position to cause the cross-head to travel towards the left-hand end of the machine. The cross-head will travel in this direction until the resilient finger 204 comes in contact with the collar 208. Firstly, the finger will be pushed against the tension of the spring therein until the free end comes in contact with the rear extension of the cross-head.

Secondly, the farther movement of the cross-head causes the rod 199 to push the free end 197 of the lever 187, thereby pushing the latch pin out of the left-hand notch in the rear of the sliding plate 185.

Thirdly, after said latch pin is released, the tension of the spring 208 in the finger 204 causes the sliding bar 185 to be moved forcibly to the left, and is held in this position by the latch pin falling into the right-hand notch in the rear of the sliding bar, thereby automatically shifting and holding the beveled gear 88, Fig. 9, and causing the cross-head to reverse its direction of travel and go toward the right of the machine.

It will be seen by referring to Fig. 6, that this automatic gear shifting is effected as the cross-head travels to the right, as well as to the left, as previously described.

The resilient fingers 204 and 205 with their respective springs are necessary for two reasons. First, the gear shifting cone 88 must be moved from one contact to the other that is across the disengaged position other than by the movement of the cross-head. If it were attempted to use this movement to shift the beveled gear, the gear would simply be pushed into the disengaged position, thereby stopping the movement of the cross-head and consequently the farther process of gear shifting.

Second, the efficiency of friction gears partly depends on the amount of pressure by which the two friction gears are held in contact. The spring in the finger in this case forcibly pushes the beveled gears in contact, where, as stated before, it is held by the latch pin in one of the notches.

In the manual control of this particular function of the machine, it is necessary that the latch pin be withdrawn and held from dropping into the notches of the sliding bar 185. The necessary pressure of the beveled gears being now controlled by the hand lever 108, it will be seen that if the latch pin were allowed to engage the notches in the sliding bar 185, it would be impossible to shift the gears by the hand lever 108. This explains the function of the lever 240, Fig. 15.

To automatically move the sliding arms, pneumatic tools, etc. forward and backward, the movable collars 212 and 213 on the rod 209, best seen in Fig. 26, must first be adjusted and fastened with the set screws, so that when the arms move forward as far as is desired, the collar 213 will engage the spring 225 on the plate 223 and trip said plate. Also, when the sliding arms, pneumatic tools, etc. move backward as far as desired, the collar 214 will engage the spring 225 and trip the plate 223 back into its original position.

This forward and backward movement of the sliding arms, pneumatic tools, etc. is accomplished as follows:—When the collars 201 and 202 are adjusted on the rod 199 for automatically moving the cross-head to the right and left, the collars 156 and 152 must be so adjusted on the rod 149, so that when the crosshead reaches either the extreme left or right-hand limit of its movement, the fingers 228 and 232 of plates 223 and 230 respectively, will come in contact with the movable collars 154 and 150 on the rod 149 (best seen in Fig. 6).

If the plates 223 and 230 are in the position as shown in Fig. 26 and the cross-head is travelling automatically toward the left, it will be readily seen by referring to Figs. 6 and 26, that when the cross-head moves to its extreme left-hand position, the finger 228 will engage the movable collar 154 and then through the elements 155, 156, 149, 140, 141, 143 and 146, the beveled gear 98 will be moved in contact with beveled gear 90, causing same to rotate thereby, through the shaft 100, Fig. 18, pinion 101, gear 102, shaft 103, pinion 104 and rack 105, the sliding arms, pneumatic tools, etc. will move backward away from the operator and continue that movement until the action of the finger 228, Fig. 26, is released by the cross-head automatically changing its direction and moving towards the right. Since the finger 232 of the plate 230 as shown in Fig. 26 is not against the gear shifting rod 149, it therefore will not come in contact with the movable collar 150 on the gear shifting rod when the cross-head reaches its extreme right-hand position; consequently, the cross-head will travel back toward the left without there being any change in the position of the sliding arms, pneumatic tools, etc. This backward movement of the sliding arms, etc. will continue to be in action every time the cross-head reaches its extreme left-hand position until the collar 214, Fig. 26, comes in contact with the spring 225 and pushes same backward against the stop 227. The farther movement causes the latch pin 216 to trip out of the notch 220, then the tension of the spring 225 moves the plate 223 so the latch 216 catches in the notch 221 and holds there. In this position, the finger 232 will be in contact with the gear shifting rod 149 and finger 228 out of contact. Now the action on the gear shifting rod 149 will be caused by the finger 232 as the cross-head reaches the right-hand limit of its movement.

By this action, the sliding arms will move forward and continue to move forward every time the cross-head reaches the right hand limit of its movement. This movement forward will continue until the collar 214 trips the plate to the position as shown in Fig. 26. The extent of each automatic forward and backward movement of the sliding arms is determined by the relative position of the collars 201 and 202 on the rod 199 to the collars 156 and 152 on the rod 140.

To illustrate, the extent of advancement the collar 156 is over the collar 201, will determine the length of time that the gear shifting rod is in action. By advancement is meant to move the collars nearer the crosshead.

It will consequently be seen from the foregoing that my novel automatic power operated pneumatic surfacer is adapted for all the conditions which arise in the treatment or surfacing of the rough stone as it comes from the quarry and through the subsequent intermediate operations.

As is well-known to those skilled in this art, the rough stone from the quarry on which the surfacer is to be used, always has a more or less uneven surface, some parts of the surface occasionally standing a foot or more above the lowest parts of the surface. Quite often the surface is made rough by a number of raised ridges. The operator adjusts his machine to the proper height for the highest point of the stone and then inserts three surfacer four-points of any conventional type, said points being held by resting on the stone handle 61 not being used for these. Now, by the use of the handle 108 and 109, the operator guides the machine so the three four-points will follow the highest ridges on the stone. This will mean using the handle 108 in all three of its functions, one of these functions being the turning of the tool carriage so as to keep the three four-points on top of the ridges. As the stone is cut away, the operator will lower the machine by use of the lever 264. When the stone is cut down to a fairly level surface and still not down to the point where it must go, which may be three inches lower, he will adjust the machine to run automatically and also adjust the lowering device over this approximately level surface, leaving him free for other duties. This automatic operation will continue until the stone is cut down to the desired level or point. After this, he must operate the machine manually, cutting down any high places which have been left on the edges of the stone. Next, the operator will take out the four-points, insert the bush chisels with the handles 61 attached, turn the head 44 slightly at an angle with the sliding arms, so that when the bush chisels move over the stone to the right and left, each will take a different path, that is, one not following directly after the other. The machine will then be set to run automatically.

The first set of bush chisels having four blades will be turned at an angle by the handle 51. These will be run automatically until they have covered the whole surface of the stone. Then a new set of bush chisels having six blades will be inserted and these will be turned by the handle 51, so that the cut marks made by these blades will cross those made by the previous set of bush chisels. This operation will be carried on using four or five sets of bush chisels, the last set containing thirty blades each. The last set of blades will be turned by handle 51, so that they will cut parallel with one of the edges of the stone.

By the method above described, one man could very easily operate two machines at one time, as is evident.

It will be understood that wherever in the specification and claims I have used the terms "right and left" and "front and back," the same are relative terms and are used assuming the operator to be standing at the front of the machine.

It will also be understoood that while I have shown the driving and driven friction cones as being employed, other forms of power transmission devices, such as gearing or other change speed or reversing mechanism may be employed as equivalents of the structure shown.

It will now be apparent that I have devised a novel and useful automatic power operated pneumatic surfacer which embodies the features of advantage enumerated as desirable in the statement of the invention and the above description, and while I have, in the present instance shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. In a device of the character stated, supporting carrier bars, a supporting head secured to said bars, a tool carriage pivotally mounted on said supporting head, a plurality of pneumatic hammers mounted in said tool carriage, a plurality of stone working implements mounted therein, and means for manually rotating said implements in unison with respect to said tool carriage.

2. In a device of the character stated, a supporting head, upper and lower plates carried by said head, a plurality of pneumatic tools having their upper and lower portions detachably mounted in said plates, bush chisels having their shanks mounted in said tools, a sliding plate, connections from said plate to said bush chisels, and means for operating said sliding plate for turning said bush chisels axially in unison in either direction.

3. In a device of the character stated, a supporting head, upper and lower plates carried by said head, a plurality of pneumatic tools having their upper and lower portions mounted in said plates, bush chisels having their shanks mounted in said tools, a control lever, and connections from said lever to said bush chisels for actuating the latter in unison in either direction.

4. In a device of the character stated, a pair of uprights, sleeves slidably mounted on said uprights, a bridge having end uprights pivotally mounted in said sleeves, a cross head slidably mounted upon said bridge, and pneumatic hammers carried by said cross head, in combination with means for raising and lowering both sleeves, and means for raising or lowering but one of said sleeves, whereby said cross head and hammers may have an inclined movement sidewise in either direction.

5. In a device of the character stated, a pair of uprights, sleeves slidably mounted on said uprights, a bridge having end uprights pivotally mounted in said sleeves, a cross head slidably mounted upon said bridge, and pneumatic hammers carried by said cross head, in combination with means for raising and lowering both sleeves, and means for raising and lowering one only of said sleeves, and means for holding the other sleeve stationary, during the movement of the opposite sleeve.

6. In a device of the character stated, a pneumatic surfacer frame, comprising uprights tied together at their top and bottom, pivotal supports for the lower ends thereof, ears on one of said uprights, a rod passing through said ears, and having a collar thereon held between said ears, a threaded stationary block engaged by the rear end of said rod, and a handle on the front end of said rod.

7. In a device of the character stated, a frame comprising end uprights, top and bottom horizontal connecting bars, pivotal supports for the lower ends of said uprights, a bridge, end sleeves therefor movable on said uprights, a pneumatic tool carried by said bridge, means for mechanically moving said tool forwards and back, means for mechanically moving said tool towards either of said sleeves, and means for inclining said frame and tool forwardly or rearwardly on said pivotal supports.

8. In a device of the character stated, a pair of end uprights, connected at their tops and bottoms, sleeves slidably mounted on said uprights, a bridge having end uprights pivotally mounted in said sleeves, one of said bridge uprights having an elongated horizontal slot therein, so as to permit play to that end of said bridge when the opposite end is elevated or lowered, a pneumatic tool carried by said bridge, nuts in said sleeves, upright feed screws engaging said nuts, and means for rotating said feed screws in unison.

9. In a device of the character stated, a pair of end uprights, connected at their tops and bottoms, sleeves slidably mounted on said uprights, a bridge having end uprights pivotally mounted in said sleeves, one of said bridge uprights having an elongated horizontal slot therein so as to permit play to that end of said bridge when the opposite end is elevated or lowered, a pneumatic tool carried by said bridge, nuts in said sleeves, upright feed screws engaging said nuts, and means for rotating said feed screws in unison, in combination with means for reversing the direction of rotation of said feed screws, and means for temporarily rendering one of said feed screws inoperative.

10. In a device of the character stated, a cross head capable of lateral movement, carrier bars slidably mounted in said cross head, and having front and rear heads, a rack having its ends secured to said heads, a pinion engaging said rack, a pneumatic tool supported from said front head, and means for rotating said pinion to actuate said carrier bars and pneumatic tool forward and back.

11. In a device of the character stated, a cross head capable of lateral movement, carrier bars slidably mounted in said cross head and having front and rear heads, a plurality of pneumatic tools carried by said front head, stone working implements carried by said pneumatic tools, a shaft rotatably supported and extending longitudinally of said carrier bars and having a worm on the forward end thereof, and connections from said worm to said stone working implements whereby said implements are rotatable in unison.

12. In a device of the character stated, a pneumatic surfacer frame having end uprights, sleeves slidably mounted on said uprights, a bridge connected to said sleeves, a cross head movable laterally on said bridge, a plurality of pneumatically operated stone working implements supported from said cross head, a prime motor, a support therefor, a plurality of shafts operated by said prime motor, means operated from one of said shafts for turning said implements in unison in either direction, and means operated from the other shafts for raising and lowering said cross head and implements and for moving the latter forward and back and laterally.

13. In a device of the character stated, a pneumatic tool carriage movably supported, a hand lever pivotally supported, connections from said lever to said tool carriage for enabling the right and left hand movement of said lever to move said carriage to the right or left and other connections from said lever to said carriage for enabling the forward and back movement of said lever to move said carriage forward and back.

14. In a device of the character stated, a pneumatic tool carriage movably supported, a hand lever pivotally supported, connections from said lever to said tool carriage for enabling the right and left hand movement of said lever to move said carriage to the right or left, and other connections from said lever to said carriage for enabling the forward and back movement of said lever to move said carriage forward and back, in combination with means for giving said carriage a pivotal movement to the right or left by connections from said lever to said carriage, whereby the axial movement of said lever will actuate said carriage.

15. In a device of the character stated, a pneumatic tool carriage, supporting means therefor, means for automatically imparting to said tool carriage an automatic forward and backward movement, means for automatically imparting to said pneumatic tool carriage an automatic movement to the right and left, and means for controlling and varying the extent of the forward and the backward automatic movement, means for controlling and varying the extent of the right hand and the left hand automatic movement, in combination with a manually controlled means for actuating said carriage in the direction stated.

16. In a device of the character stated, a pneumatic surfacer frame, pneumatic tools movably supported thereon, a motive force and connections from said motive force to said pneumatic tools for automatically moving said pneumatic tools to and fro longitudinally, and other connections from said motive force to said pneumatic tools for automatically imparting an intermittent step by step forward or backward movement to said pneumatic tools, and means for controlling and varying the extent of each automatic step by step movement of said pneumatic tools.

17. In a device of the character stated, a pneumatic tool carriage, a support therefor, and means for imparting to said support and carriage an automatic, intermittent downward feed movement.

18. In a device of the character stated, a pneumatic tool carriage, a support therefor, means for mechanically raising and lowering said support and carriage, and means for throwing out of operation said raising and lowering means and for imparting a step by step automatic intermittent downward motion to said pneumatic tool carriage and its support.

19. In a device of the character stated, a pneumatic tool carriage, a support therefor, means for imparting an automatic forward and back, and an automatic right and left-hand movement to said carriage, and means for imparting to said carriage an automatic intermittent downward feed movement.

20. In a device of the character stated, a pneumatic tool carriage, supporting means therefor, sleeves suitably supported upon which said tool carriage supporting means is carried, nuts in said sleeves, upright feed screws at each end of the machine in engagement with said nuts, means for operating said feed screws in either direction to raise and lower said pneumatic tool carriage and its support, and means for imparting an intermittent downward feed to said carriage.

21. In a device of the character stated, a pneumatic tool carriage, supporting means therefor, sleeves suitably supported upon which said tool carriage supporting means is carried, nuts in said sleeves, upright feed screws at each end of the machine in engagement with said nuts, power operated means for actuating said feed screws in either direction to raise and lower said pneumatic tool carriage and its support, means for throwing said feed screw mechanism out of operation, mechanism for automatically, intermittently feeding said pneumatic tool carriage downwardly, and means for throwing said automatic downward feeding mechanism into and out of operation.

22. In a device of the character stated, a pneumatic tool carriage adapted to carry a plurality of pneumatic tools, a support therefor, a power operated hoist for raising and lowering said pneumatic tool carriage, automatic power operated means for effecting an intermittent automatic step by step downward feeding of said pneumatic tool carriage and means for throwing said last mentioned automatic mechanism into and out of operation.

23. In a device of the character stated, a pneumatic tool carriage and means for causing said carriage automatically to travel forward and back and right and left to act upon the rectangular area of the stone to be dressed, in combination with means for imparting an oscillating movement to said carriage in any of its positions.

24. In a device of the character stated, a pneumatic tool carriage, automatic means for enabling said carriage to act upon the rectangular area of the stone to be dressed and means for imparting an automatic, intermittent step by step, downward feed to said tool carriage and its adjuncts.

25. In a device of the character stated, a pair of uprights pivotally supported at their lower ends, sleeves mounted on said uprights, a bridge carried by said sleeve, a cross head carried by said bridge, carrier bars movable in said cross head, a pneumatic tool carriage supported upon said carrier bars, power driven means for actuating said pneumatic tool carriage and carrier bars forwardly and backwardly and to the right and left and means for inclining said sleeves and uprights forwardly or backwardly.

26. In a device of the character stated, a pneumatic tool carriage, a support on which said carriage is pivotally mounted, a control lever, means for enabling said lever to have an axial, a forward and back and a right and left hand movement, connections intermediate said lever and carriage, whereby the axial movement of said lever oscillates said carriage, other connections intermediate said lever and carriage whereby the forward and back movement of said lever actuates said carriage forward and back, and other connections from said lever to said carriage, whereby the right and left hand movement of said lever actuates said carriage to the right or left, in combination with automatic means for automatically operating said carriage forward or back or to the right or left.

LEON L. COLLINS.

Witnesses:
E. HARPER FAIRBANKS,
MYRTLE K. COLLINS.